United States Patent [19]

Tsuruta et al.

[11] Patent Number: 4,779,208
[45] Date of Patent: Oct. 18, 1988

[54] INFORMATION PROCESSING SYSTEM AND METHOD FOR USE IN COMPUTER SYSTEMS SUITABLE FOR PRODUCTION SYSTEM

[75] Inventors: Setsuo Tsuruta, Sagamihara; Shoji Miyamoto; Makoto Nohmi, both of Kawasaki, all of Japan

[73] Assignee: Hitachi, Ltd., Tokyo, Japan

[21] Appl. No.: 654,487

[22] Filed: Sep. 26, 1984

[30] Foreign Application Priority Data

Sep. 28, 1983 [JP] Japan ............................. 58-177955
Sep. 28, 1983 [JP] Japan ............................. 58-177959

[51] Int. Cl.$^4$ ........................................... G06F 15/18
[52] U.S. Cl. ................................................. 364/513
[58] Field of Search ..................................... 364/513

[56] References Cited

PUBLICATIONS

Patrick Winston, *Artificial Intelligence*, pp. 166–174.

Primary Examiner—Jerry Smith
Assistant Examiner—Gail O. Hayes
Attorney, Agent, or Firm—Antonelli, Terry & Wands

[57] ABSTRACT

A computer system performs processing such as inference processing by sequentially executing rules each with its if-part stored in a working memory. The computer system comprises a production memory storing rules such as the laws of experience and nature and a working memory storing facts and hypothesis. The processing system processes the case where the rules include variables. To this end, this processing system groups the if-items and then-items which may be matched with each other depending on variable values, and takes representatives of the respective grouped items as association items to store the facts by the local parts of the association items.

14 Claims, 27 Drawing Sheets

FIG. IC

Rule R1
  if
    ( >F  likes wine )
    ( >F  is female )
  then
    ( ad ( John likes >F ))
    ( rm ( Adam likes >F ))

Rule R2
  if
    ( >F  is female )
    ( >F  likes sports )
  then
    ( ad ( John likes >F ))

Rule R3
  if
    ( >F  is beautiful )
    ( >F  is female )
    ( >M  likes >F )
  then
    ( ad ( >M loves >F ))

Rule R4
  if
    ( >F  lies )
    ( >M  loves >F )
  then
    ( rm ( >M likes >F )
        ( >M loves >F )
        ( >F lies ))

Rule R5
  if
    ( >P  is young )
    ( >P  comes from Paris )
  then
    ( ad ( >P likes wine ))

FIG. ID ( Mary likes wine )
( Mary is female )
( Hana is female )
( Kate is female )
( Karen is female )
( Mary likes sports )
( Mary is beautiful )
( Hana is beautiful )
( Mary lies )
( Hana is young )
( Kate is young )
( Kate comes from Paris )

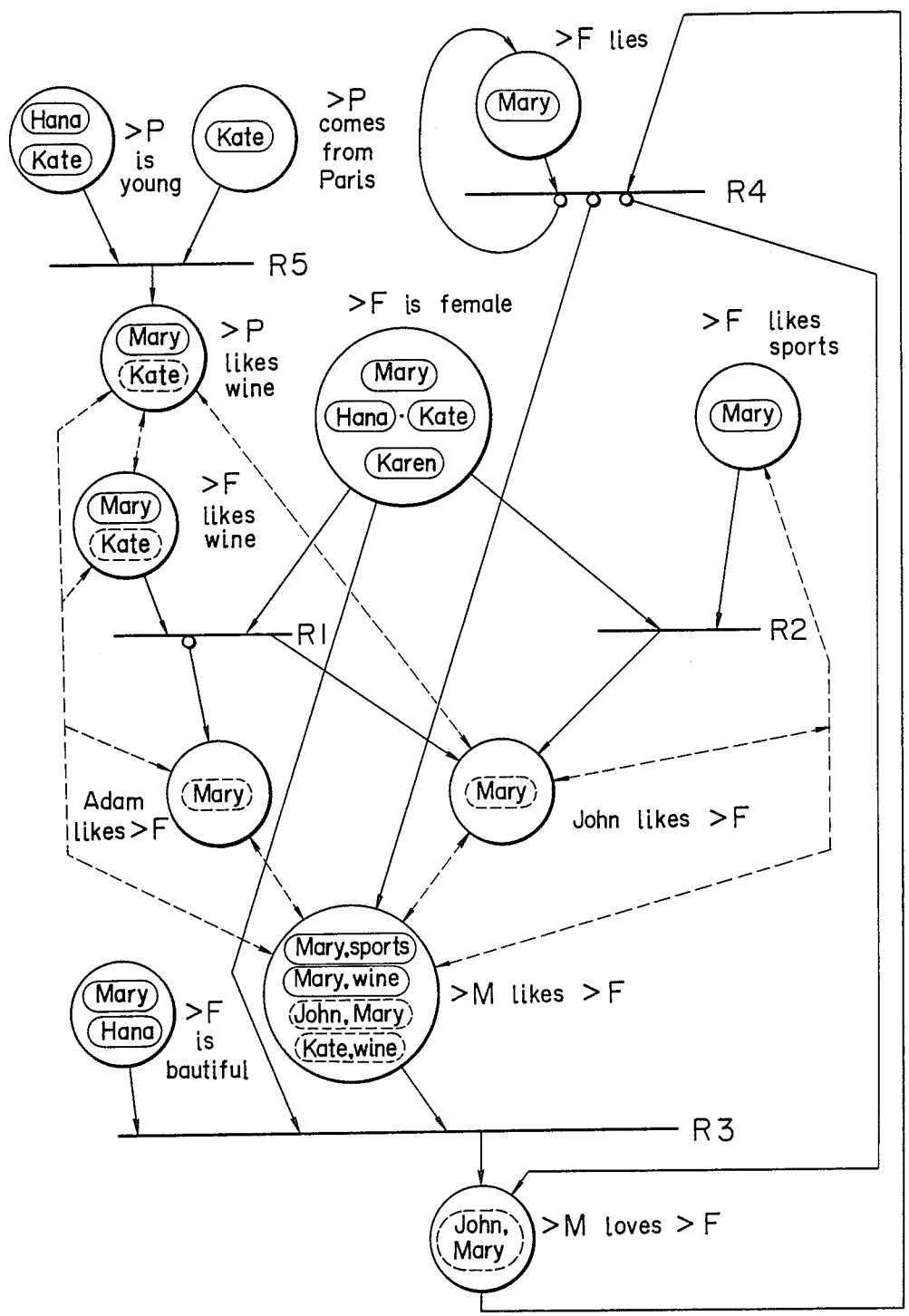
FIG. IF

F I G. 20
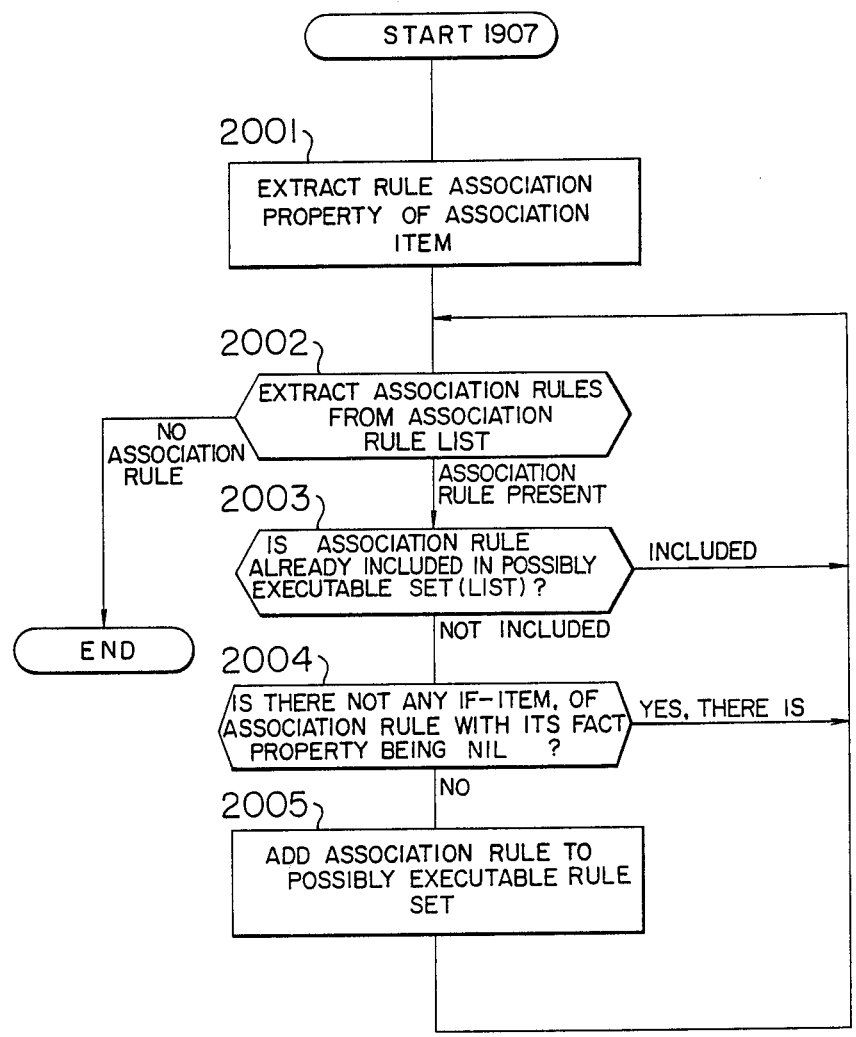

INFORMATION PROCESSING SYSTEM AND METHOD FOR USE IN COMPUTER SYSTEMS SUITABLE FOR PRODUCTION SYSTEM

BACKGROUND OF THE INVENTION

This invention relates to a high speed processing system for an information processing system which infers a new fact and hypothesis from the laws of experience and nature, and initial fact (such an inferrence is called "production"), and more particularly to a high speed processing system for use in a computer system for high speed inferrence. This processing system is preferably used when the computer system requires long times to operate because of its large scale or its high degree of complexity or, it requires real time performance.

In order to carry out inferrence processing on the basis of rules and facts, the above production system determines inferrence executing rules by taking a match between all rules and all facts for each cycle of inferrence processing, but this production system is not effectively used in a practical scale of a computer system since the increase of rules and facts gives rise to an abrupt increase of inferrence time.

The system using the coding of rules and facts and its indexing has been adopted to obviate the abrupt increase of inferrence time. This system exhibits an excellent efficiency and wide application when using a discrimination net. However, this system using a discrimination net may also find difficulty in practical real time processing applications since the discrimination net provides a large overhead. The overhead may become prohibitively large depending on the characteristic of the condition of items of the rules.

The following system which is a kind of filter has been proposed: The rule is accompanied by a counter, the initial value of which is set to the number of if-items (referred to as condition items) of the rule; the counter is counted down by 1 when a fact similar to each if-item of this rule is added to a working memory which is a pool for facts, while the counter is counted up by 1 when the above fact is removed; this rule is added as a member of a group of possible execution rules when the count becomes zero or minus; and then a more complete execution check is carried out. However this system provides poor efficiency. This is due to the following reasons: When there are continuously added facts corresponding to the case where the values of the variables of the same condition item are different, the above counter becomes always zero or minus; and so the rule whose other if-items remain empty of fact property is added to the possible executable rule set; and there occurs a loss when it is determined that the executing condition is not satisfied, since all possible combinations of variables are attempted. Also, in this system there can only be found similar if-items so that there may occur an unsatisfactory result that a rule not satisfying the execution condition may be added to the possibly executable rules, and also, even a rule satisfying the execution condition may be removed from the possibly executable rules in some cases.

SUMMARY OF THE INVENTION

An object of this invention is to provide a system for effectively selecting possibly executable rules to enhance the execution speed of a production system or the other computer systems to achieve a speed sufficient for practical use and to obviate the abrupt reduction of performance. The production system enables sophisticated processing of intellectual information. The required execution speed is such as to comform to the real time property as required in command-and control, for example. The reduction of performance is attributable to the numbers of rules, conditions, facts and variables.

In order to attain the above object, in accordance with this invention, there is provided a high speed processing system in a computer system for performing information processing by repeating a cycle during which, when a rule having an if-part, and an action part or then-part (referred to as an action part), fact and hypothesis (referred to as a fact) are provided, the action part of the rule with the if-part satisfied by the fact or hypothesis is executed to alter the fact. This high speed processing system is characterized in that a fact is registered as the fact property of the corresponding if-item when the fact is added, all if-items of the if-part of the rule containing the pertinent if-item are checked to determine whether or not their fact properties are nil, and only the rules with any if-item which is not nil in its fact property is added to a list of possibly executable rules.

Further, in accordance with this invention, there is provided a high speed processing system for a computer system, which is featured in performing information processing through a network called an association net when an initial fact is inputted as an instance value. The association net indicates what condition item in what rule is satisfied by the item related to addition or deletion of fact or hypothesis in an action part of the rule, depending on the instance value of the item. This net is formed before execution of the information processing.

BRIEF DESCRIPTION OF THE DRAWINGS

The present invention will be apparent from the following detailed description taken in conjunction with the accompanying drawings, in which:

FIGS. 1C-1F show diagrams for explaining embodiments of this invention;

FIGS. 14-23 show flowcharts for inferrence execution processing.

DESCRIPTION OF THE PREFERRED EMBODIMENT

Hereinafter, one embodiment of this invention will be explained referring to FIGS. 1-15.

Figure 1A:
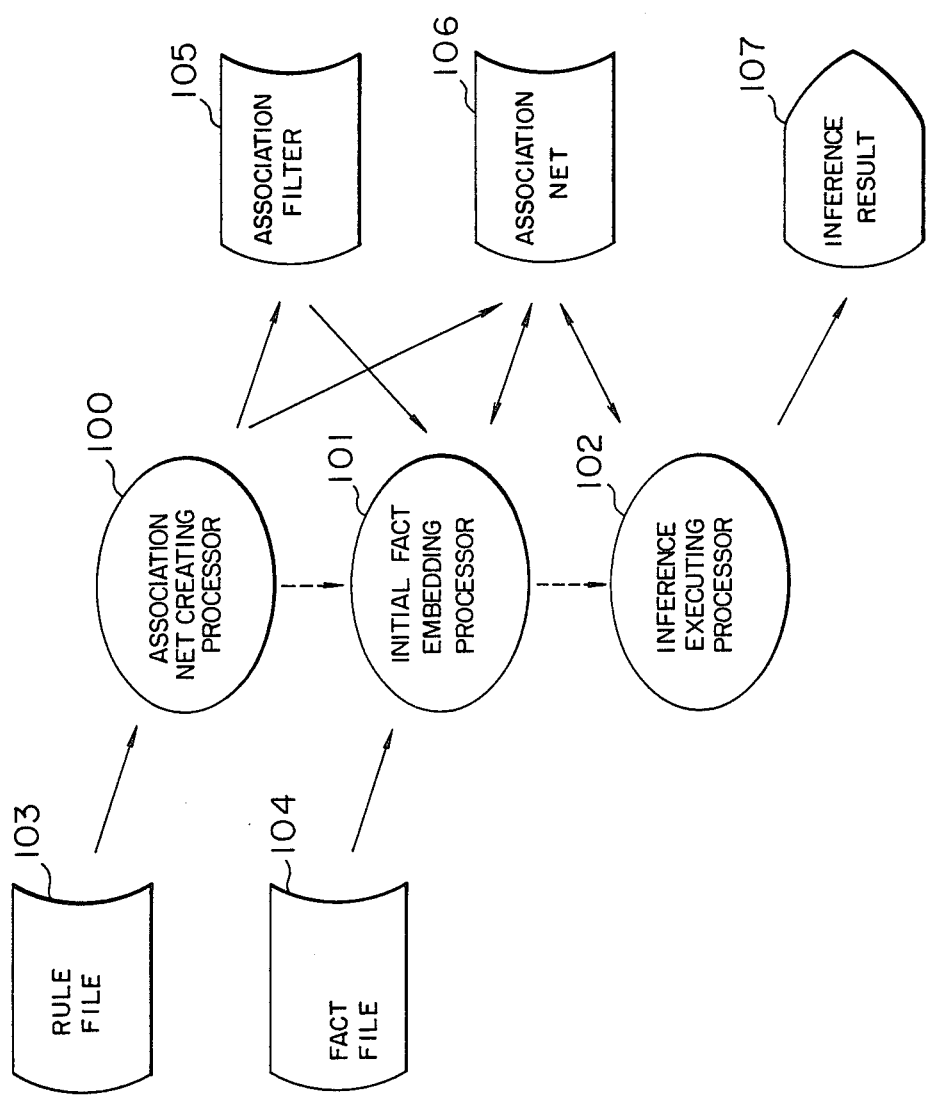
FIG. 1A shows a software structure of one example of a system for implementing this invention.

FIG. 1A shows a software system structure for implementing the system of this invention. In this figure, an association net creating processor 100 extracts a certain rule from a rule file 103, analyses the firing condition of the rule and its influences on the firing or inferrence of the other rules, and outputs the result of analysis as an association net 106 (whose fact property is entirely empty since it is before facts are embedded, namely when the fact property of the association net is entirely empty). The association net creating processor 100 also creates an association filter 105 for efficiently embedding an initial fact into the association net. An initial fact embedding processor 101 extracts a fact from an initial fact file 104 and inserts or embeds it into the pertinent position of the association net 106. An inferrence executing processor 102 executes high speed inferrence on the basis of association net 106 and outputs an inferrence result 107.

Figure 1B:
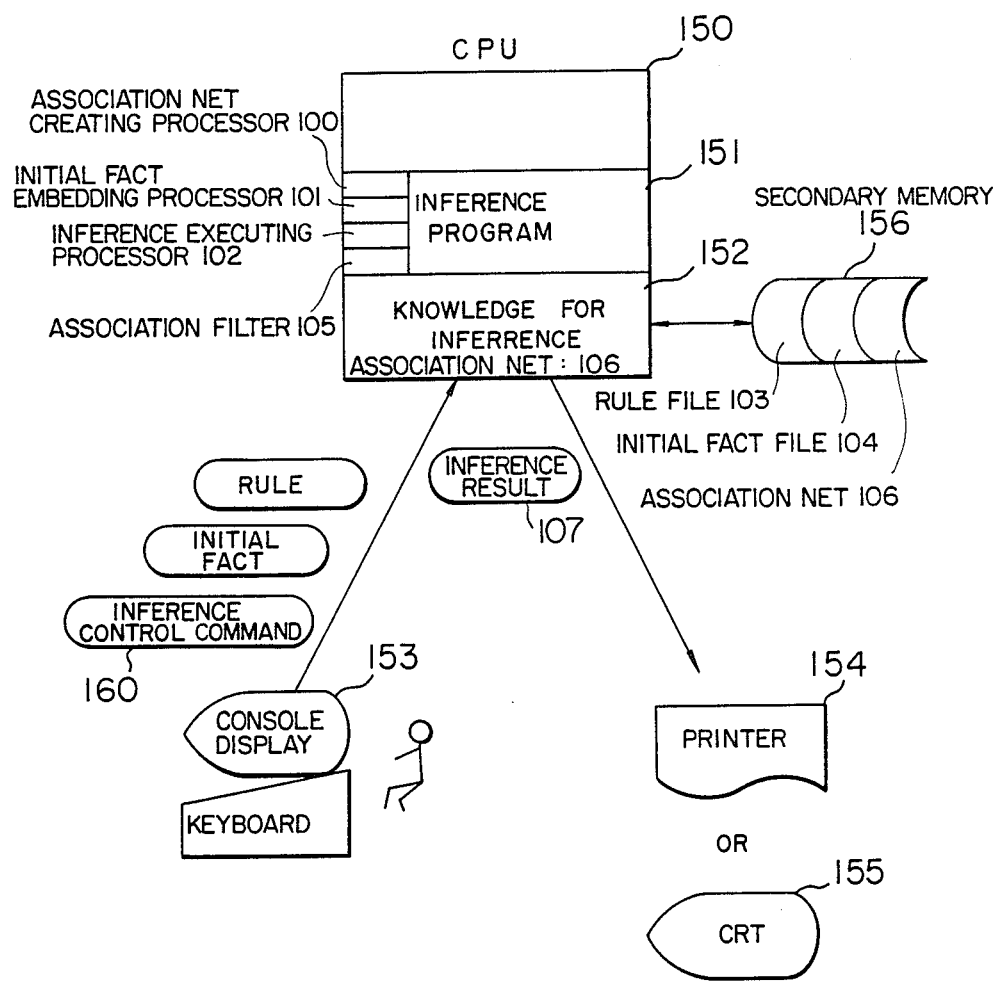
FIG. 1B shows a computer structure including the hardware of this invention.

FIG. 1B shows a computer system for implementing the system of this invention. As seen from the figure, there are located, in a CPU 150, the association net creating processor 100, initial fact embedding processor 101, inferrence executing processor 102, and association filter as an inferrence program 151, and the association net 106 as knowledge for inferrence 152.

The rule and initial fact are inputted from a console display 153 (keyboard or console typewriter may be employed). The initial fact can be inputted through a sensor in an actual system. An inferrence control command 160 such as execution of inferrence (or preparation of inferrence such as the creation of association net 106) is also inputted from console display 153.

The result of inferrence is outputted to a line printer 154 and CRT 155 or a secondary memory device 156 such as a disk and M/T. An inferrence control command 160 enables the process of inferrence reaching the result thereof to be outputted for explanation.

A secondary memory device 156 can store rule file 103, initial fact file 104, and association net 106, which can be employed for error recovery, pre-edit or preprocessing.

FIG. 1C shows an embodiment of rule assemblage in the above production system. In this figure, >F denotes that F is a variable while characters not headed with > are constants. F denotes female; M denotes male; and P denotes person. Further, ad in action item (then-item) denotes an item to be removed while rm denotes an item to be added.

Figure 1E:
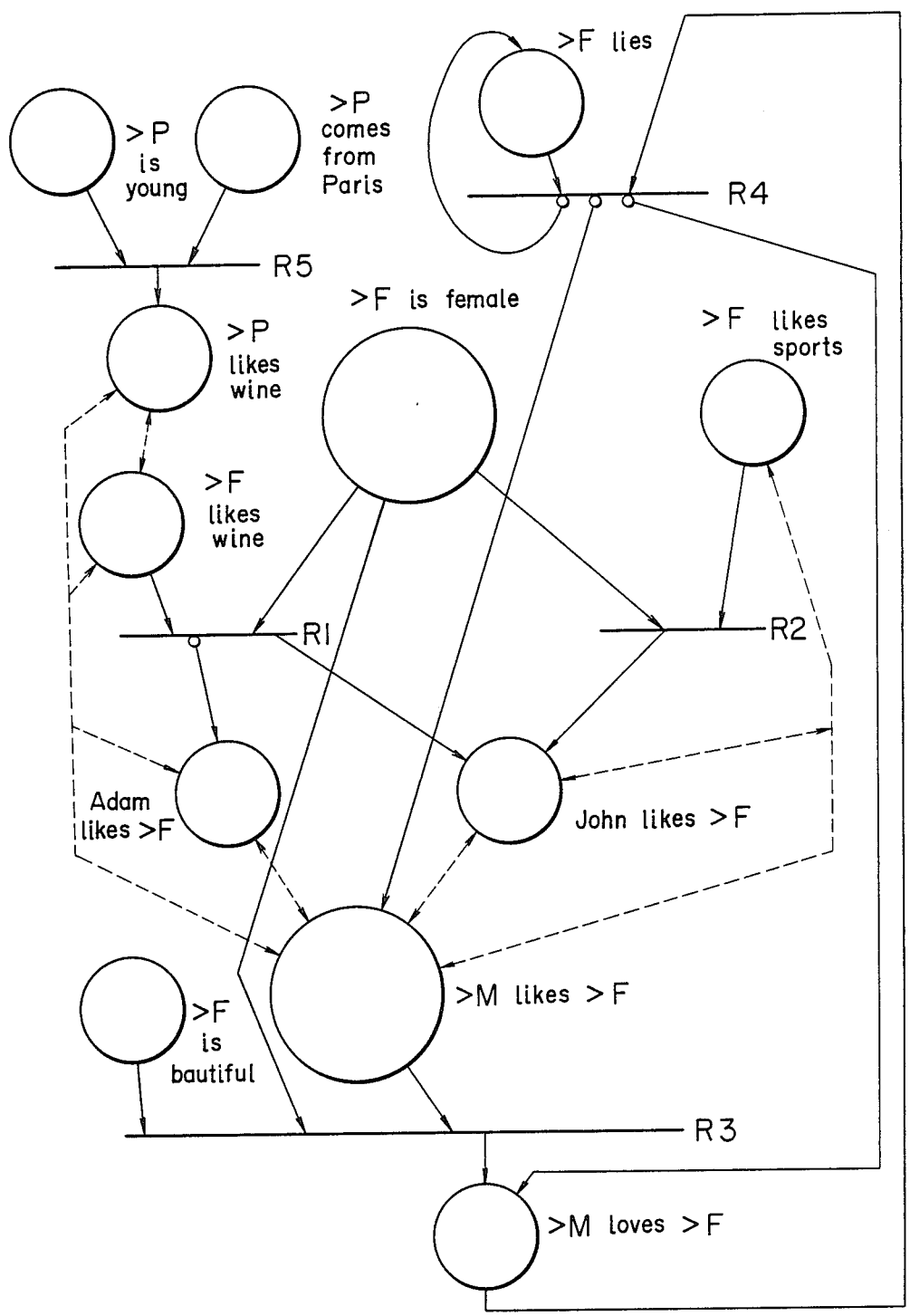

Assuming that initial facts are as shown in FIG. 1D, there is provided a network of execution relation, that is, the association net before the initial facts are embedded, such as shown in FIG. 1E. In FIG. 1E, horizontal lines marked with rule number Ri imply that their upper part and lower part correspond to the if-parts and then-parts of the pertinent rule as shown in FIG. 1C. Small circles under the horizontal line imply that large circles pointed to by arrows emanating from the small circles are items to be removed.

FIG. 1F shows the state where the facts of FIG. 1D are embedded in FIG. 1E. In FIG. 1F, ellipses surrounded by solid lines denote facts already entered, and ellipses surrounded by dotted lines denote states when a new initial fact (Kate comes from Paris) is added thereto. Further, in FIG. 1, circles which surround ellipses represent the item of rules, and items which are connected by a dotted line denote associated items.

Figure 2:
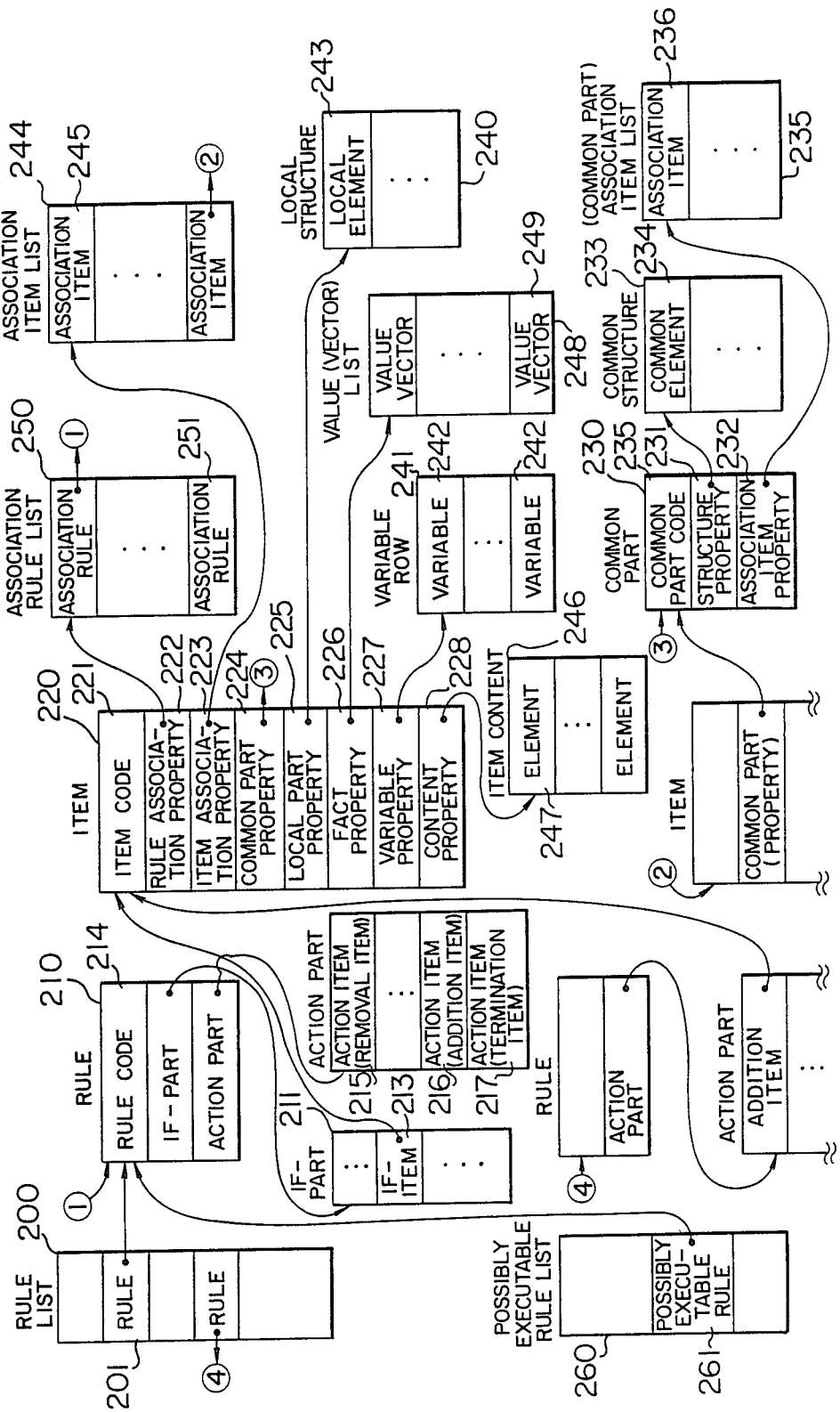
FIG. 2 shows an association net structure.

FIG. 2 shows the data structure of an association net 106 for executing efficient inferrences.

In the figure, 200 designates a list of rules, and its elements are rules 210 each coded and consisting of an if-part (condition part) 211 and an action part (then-part) 212. Each of the items respectively included in the if-part and action part is also coded. The if-part consists of if-items 213 and the action part consists of action items 215-217. The action items are classified into items to be removed 215, items to be added 216, items to be terminated 217, etc. Item 220 is composed of item code 221; rule association property shows the contents of respective items 213, 215-217, and 222 having a list 250 of association rules 251 as its value, each association rule having items in its if-part; item association property 223 having an association item list 244, the list of the same type of items (association items 245), as its value; common part property 224 having a common part 230 among the association items as its value; local part property 225 having a local part (local structure 240 consisting of local elements 243) as its value; fact property 226 indicating whether the item is a known fact; variable property 227 having as its value variable row 241 consisting of successively arrayed variables 242 included in the item (the variable may be a function and this also applies hereinafter); and content property 228 having content 246 of the item consisting of elements 247 as its value.

A value (row) list 248 is a list of rows of values or vectors of the variables of the item (vectors 249) and indicates the value of the fact property 226 when the item contains variables 242.

The common part 230 consists of its code 235, structure property 231 and association item property 232. The structure property 231 having as a value common structure 233 consisting of common elements 234; each common element is such as only the local elements 243 of the item elements have been converted into "_" (underline). The association item property 232 has as a value a common part association list 235 consisting common part association items 236 which are all the items having this common part.

A possibly executable rule list 260 is a list of possibly executable rules 261.

Figure 3:
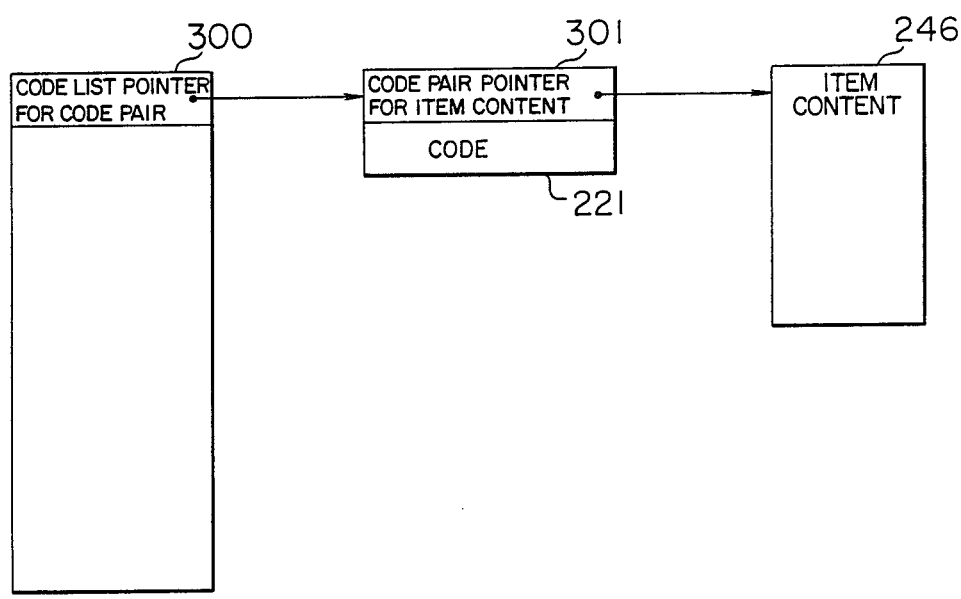
FIG. 3 shows the data structure of a code list.

FIG. 3 shows the data structure of code list 300 for registering the code items 220. This code list includes a plurality of code pairs 301 each of which consists of item code 221 and a pointer for pointing to the item content 246. This pointer is referred to as a code number herein. Code list 300 is employed for coding items which will be explained later referring to block 602.

Figure 4:
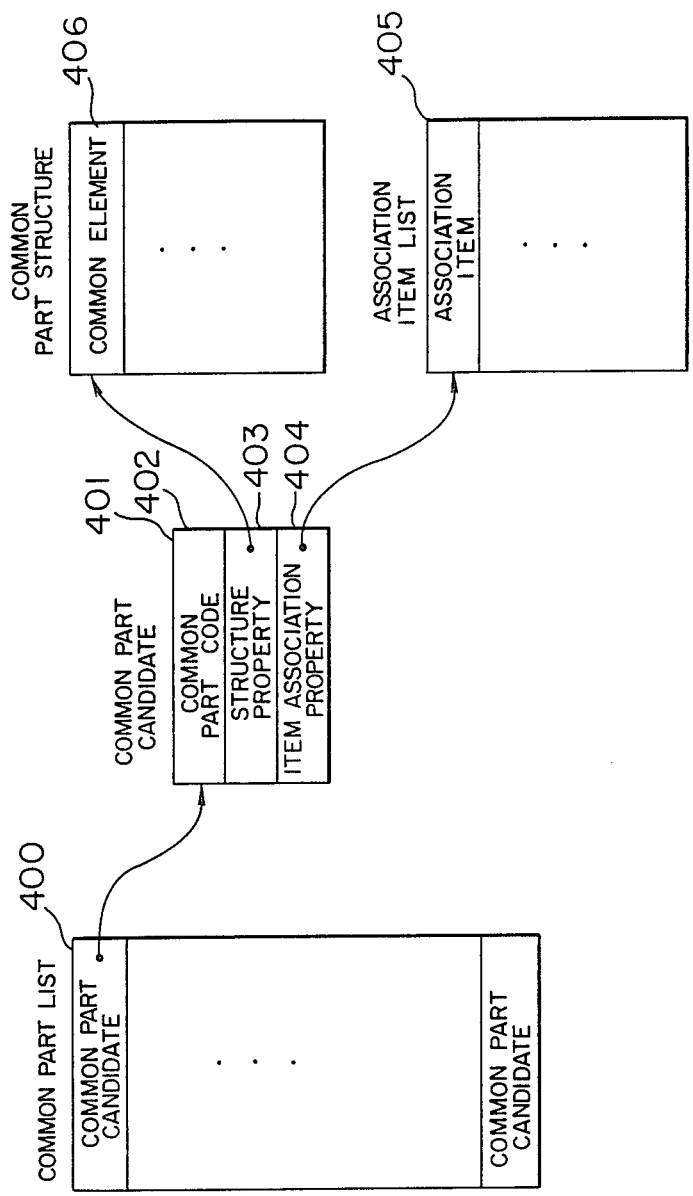
FIG. 4 shows the data structure of the common parts of the association net.

FIG. 4 shows the data structure of an association net common part. This data structure is provided in the course of a common part extraction process, which will be explained later referring to block 603. Each of the common part candidates 401 which is a candidate of the common part is the same as common part 230 after the completion of the association net common part extraction process. A common part list 400 also includes a list of elements of common part candidates 400 in the course of the common part extraction process and elements of common parts 230 after the completion thereof. A common part code 402, structure property 403, item association property 404, common element 406 and association item list 405 are the same as the common part explained in FIG. 2 except that they are directed to the common part candidate.

Figure 5:
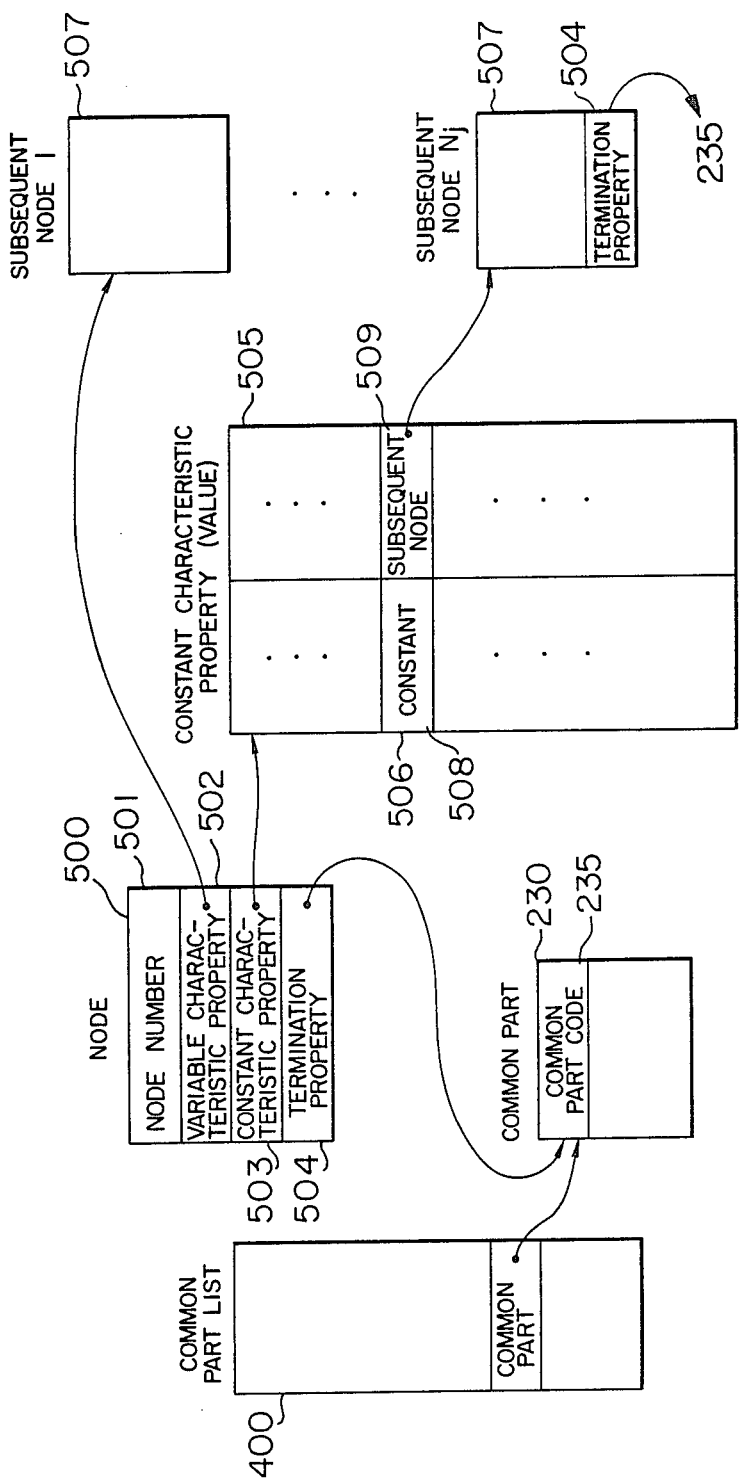
FIG. 5 shows an association filter structure.

FIG. 5 shows the construction of association filter 105. The association filter is a tree structure of nodes 500 which start from an initial node which is zero in node number 501. Each node consists of node number 501, variable characteristic property 502, constant characteristic property 503, and termination property 504. The processing system reads in elements (constant, variable) of an initial fact while moving on the nodes.

The variable characteristic property 502 has as a value a node (next node 507) at the destination of the system when the system reads in the variable. The constant characteristic property 503 has as a value a list (constant characteristic property value 505) of elements of pairs 506 each consisting of a constant to be read-in 508 and its corresponding next node 509. When the system reads in any common part registered in common part list 400, termination property 504 has as a value a common part code 235 of the read common part 230 where node 500 is that of the destination from the initial node, and has as a nil value where node 500 is not the above one.

Figure 6:
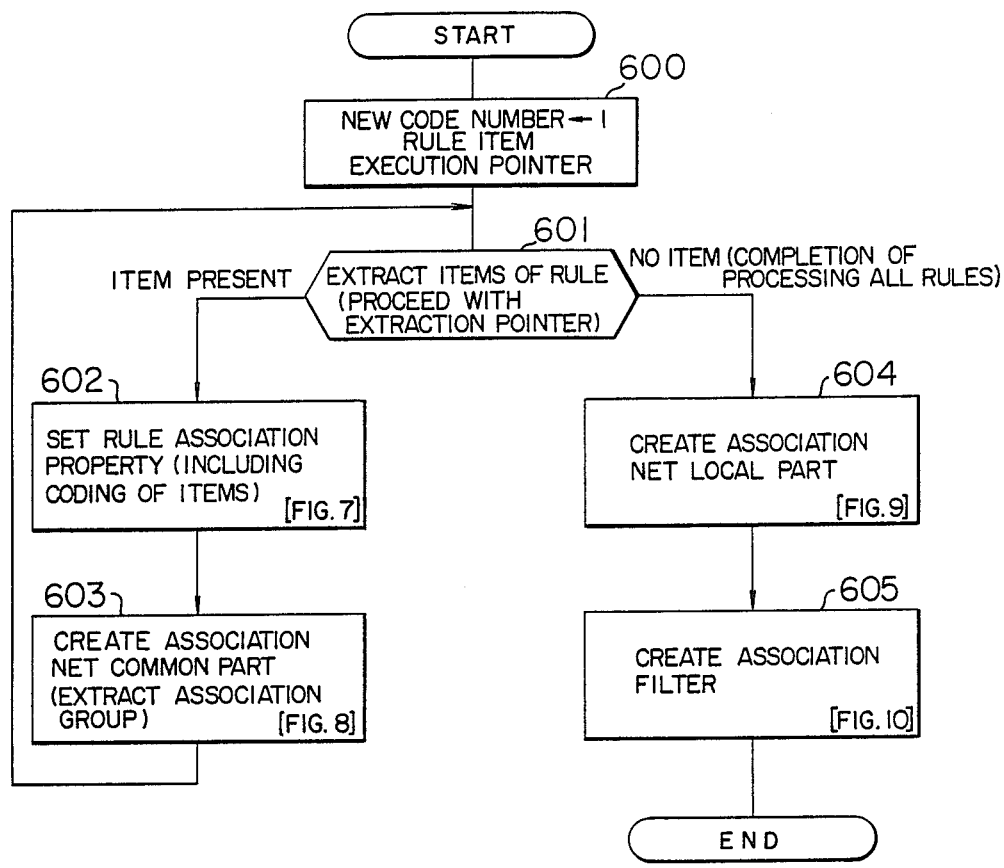
FIG. 6 shows a flowchart for creating the association net.

FIG. 6 shows an association net creation process.

In order to assign unique numbers to respective items of a certain rule, which have the content of a sign row different from each other, respectively, initial setting of 1 is made to a new code number and a pointer for extracting the respective items of the rule (block 600). Next, an item is extracted from rule file 103 and the pointer is renewed (block 601). The respective extracted items are coded for high speed matching to be embedded or inserted into rule 210 of association net 106 and rule association property 222 is set (block 602). Further, common part 230 of the association net 106 is extracted (block 603). The above processing is performed for the items of all rules contained in rule file 103, and thereafter local structures 240 of association net 106 are created (block 604). The association filter 105 is also created (block 605).

Figure 7:
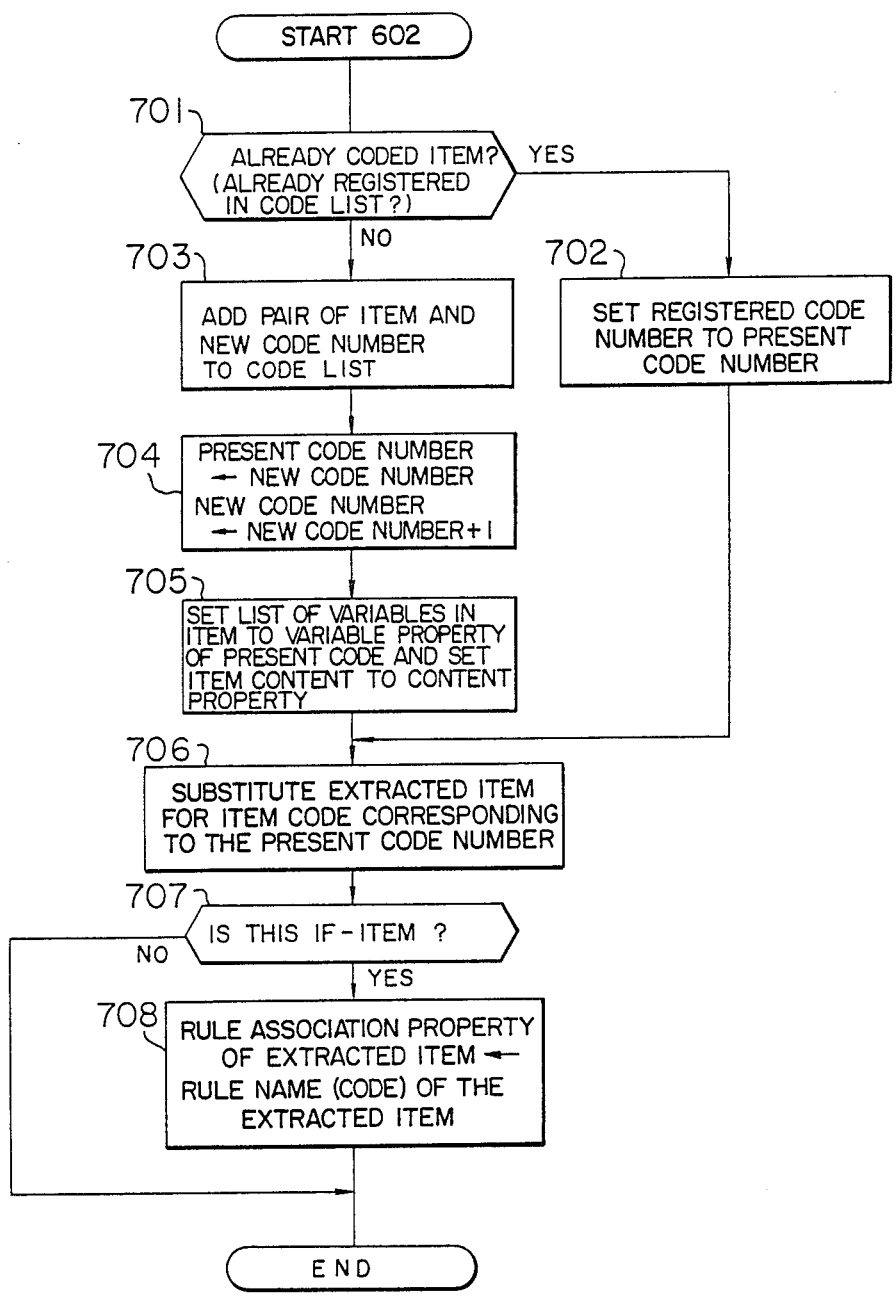
FIGS. 7-10 show flowcharts for creating the association filter.

FIG. 7 shows a process of creating rule 210 with items coded and setting rule association property 222.

The item extracted in block 601 is checked in block 701 to determine whether it has been registered in code list 300. If already registered, the registered code is set as a present code (block 702). If not already registered, a pair consisting of item content 246 and the new code number (code pair 301) is added to code list 300 (block 703), and the present code number is set to the new code number, which is renewed (block 704). A list 241 of variables 242 successively connected from its head in the extracted item is set to the variable property 227 of item 220 having item code 221 uniquely corresponding to the present code number, and item content 246 is set to the content property 228.

After the completion of the processings of block 702 or block 705, the item code 221 of item 220 of rule 210 is employed to make a network from the if-part 211 or action part 212; the network becomes a part of the association net 106 (block 706). Further, if the item being processed is the if-item 213, the rule code 214 of the rule to which the item belongs is added as the value of its rule association property 222, i.e., elements 251 of association rule list 250.

Figure 8:
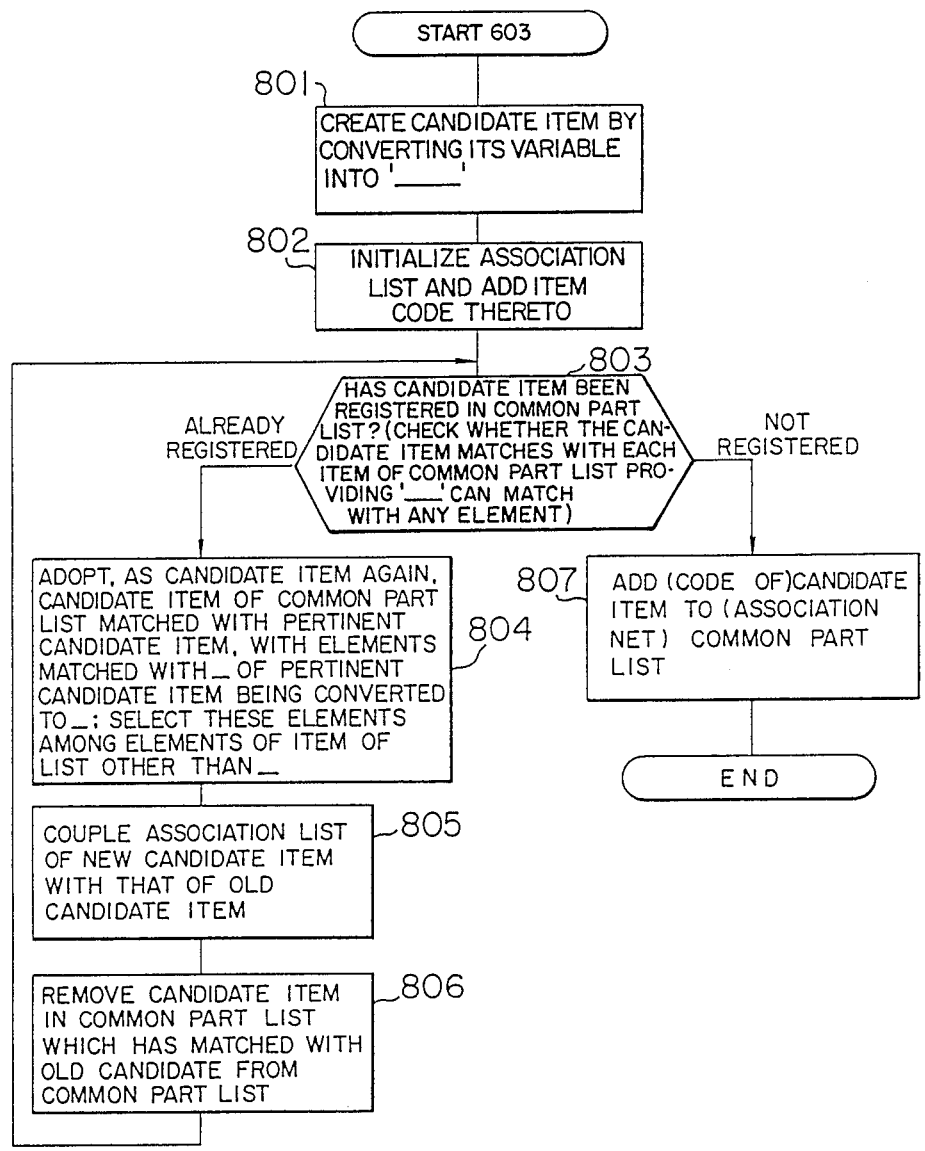

FIG. 8 is a processing flowchart of extracting and creating common parts 230 of items in the association net 106.

In block 801, the item extracted in block 601 with variables (including functions) converted to "_" is used as a common part candidate item 401. The code (future common part code) 402 of this candidate item is set to ai when the code of the extracted item is fi, for example. In block 802, the code 402 of the above candidate item is set to the item association property 404 thereof.

In block 803, the common part candidate item 401 is checked to determine whether it has been already registered in common part list 400. This checking is carried out by matching the candidate item and the respective candidate items already registered in common part list 400. Incidentally, it is assumed that this matching permits "_" to be matched with any element (constant or variable).

If the pertinent candidate item 401 is one already registered, as a candidate item adopted again is the candidate item of the common part list matched with the pertinent candidate item, with the elements matched with "_" of the pertinent candidate item being converted to "_"; these elements are selected among the elements 406 other than "_". The code of this candidate item is taken as the code of the above matched candidate item of the common part list (block 804). Next, the association list of this new candidate item is coupled with that of the old candidate item (block 805). The candidate item in the common part list which has matched with the old candidate is removed from common part list 400 (block 806). The processing from block 803 to block 806 is repeated while the processing result in block 803 represents "already registered". When the result represents "not registered", candidate item 401 is added to common part list 400 of association net 106 (block 807) thereby to terminate the common part extraction process for the item extracted in block 601.

Figure 9:
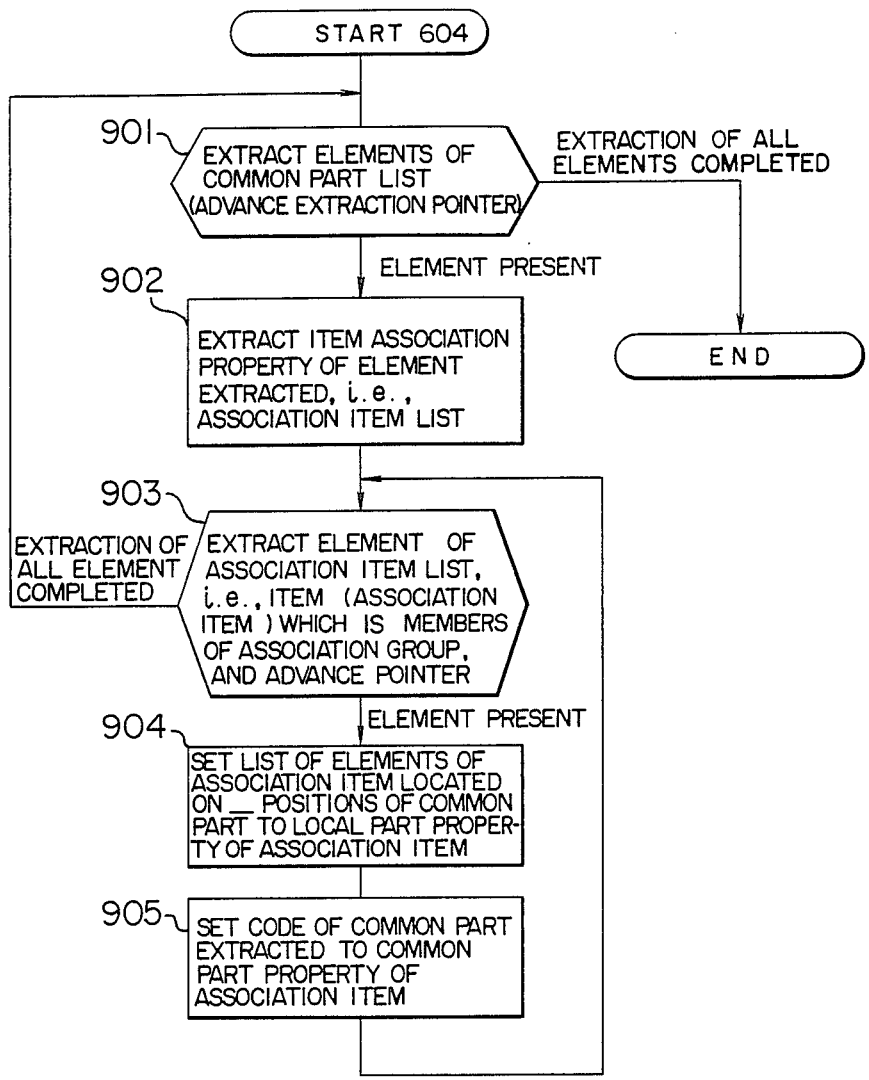

FIG. 9 shows a processing flowchart for creating a local part (local structure 240) in each item among association net 106.

Elements of common part list 400, i.e., common parts 230 (in the following processing, common part candidate items 401 are necessarily common parts since the common part list has been established) are sequentially extracted (block 901) and the value of item association property 223 of each comon part 230, i.e., association item list 244 (comon part association item list 235) is extracted (block 902). Next, its elements (association items 245), which are members of the group of association items (association group) each commonly having common parts, are sequentially extracted (block 903). After all the extractions of the elements of the association item list has been completed, returning to block 901, a subsequent element is extracted from common part list 400. Thus, the same processing is repeated until all the elements of the common part list are extracted.

In block 904, a list of elements 247 of association item 245 is extracted to be set to local structure 240 as a value of local part property 226 of the extracted association item 245. These elements lie on the positions corresponding to the elements of "_" in common structure 233. Common part property 224 of the association item is set to the code of common part 230 extracted in block 901. In the same manner, the item association property 223 of the association item is set to the value of the item association property 232 of the above common part (block 905). Then, the sequence is returned to block 903.

Figure 10:
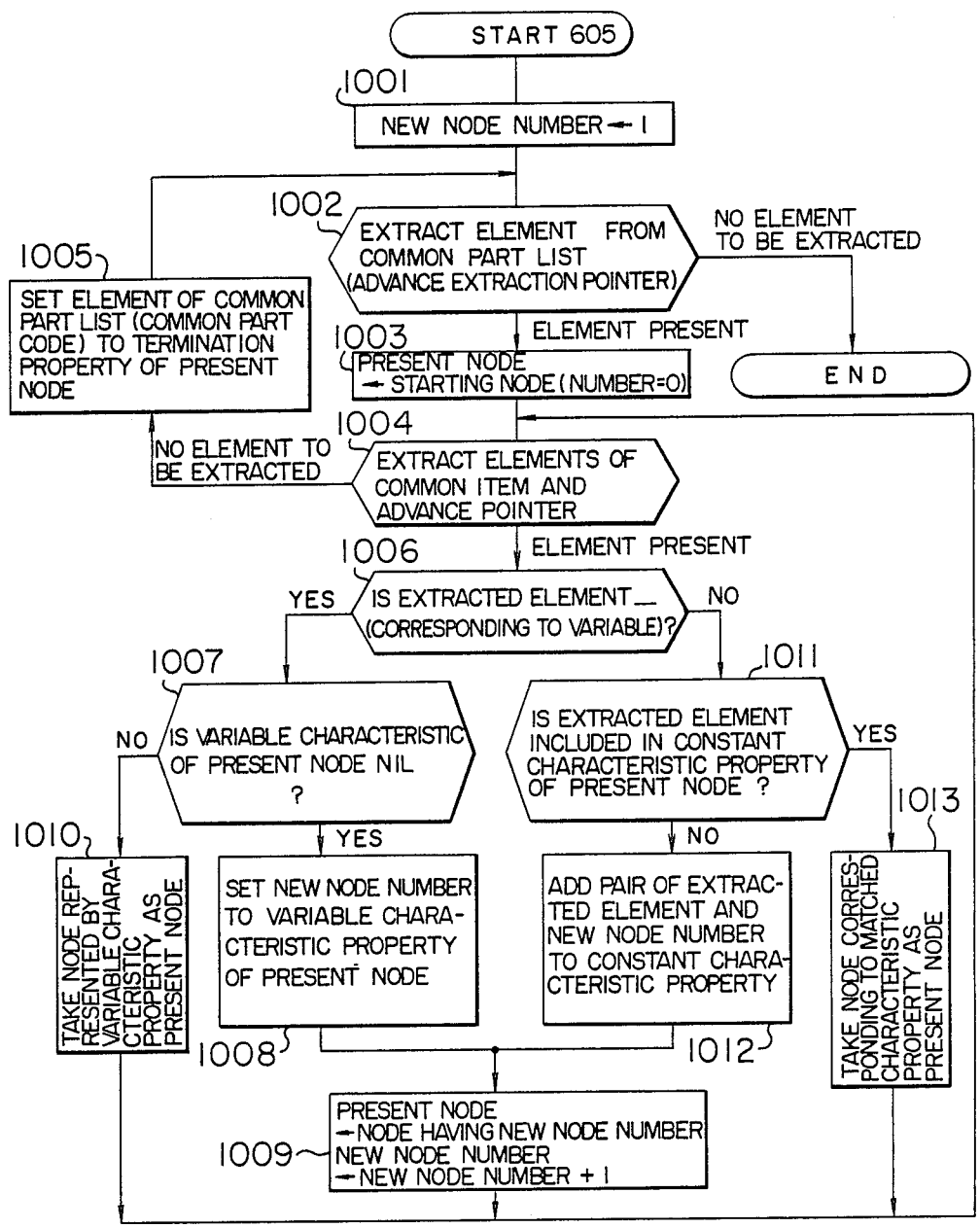

FIG. 10 shows a processing flowchart of association filter creation process 105 for embedding initial fact 104 into association net 106.

In block 1001, the number to be given to the nodes of association filter 105 (new node number) is set to 1. The elements 235 of common part list 400 are sequentially extracted therefrom (block 1002). When the elements to be extracted have become nil, the processing is terminated. If any element to be extracted exists, a present node is taken as a starting node (node with the number 0, for example) (block 1003). The elements 234 of common part 230 are sequentially extracted (block 1004). The extracted element 234 is checked to see if it is "_"

(corresponding to a variable) (block 1006). If Yes, checking is made to see if the value of the variable characteristic property 502 of the present node 500 is nil (block 1007). If nil, a new node number is set as the variable characteristic property 502 of the present node (block 1008). If not nil, the value of variable characteristic 502 is taken as the present node (block 1010). If the result of processing in block 1006 is No, checking is made to see if the element 234 extracted in block 1004 is included in the constant characteristic property 502 of the present node (block 1011). If not included, a pair of the extracted element 234 and the new node number is added to the constant characteristic property 503 of the present node (block 1012). If included, the node corresponding to the element 506 of the matched constant characteristic property value 505 is taken as the present node (block 1013). After the processings of blocks 1008 and 1012 are terminated, the node with the new node number is taken as the node, and the new node number is renewed. Returning to block 1004 after the processings of blocks 1009, 1010 and 1013, the processings of block 1006 et seq are repeated until any elements of common part 230 have become nil. When any element has become nil, the code 235 of common part 230 extracted in block 1002 is set to the termination property of the present node 500 (block 1005).

Figure 11:
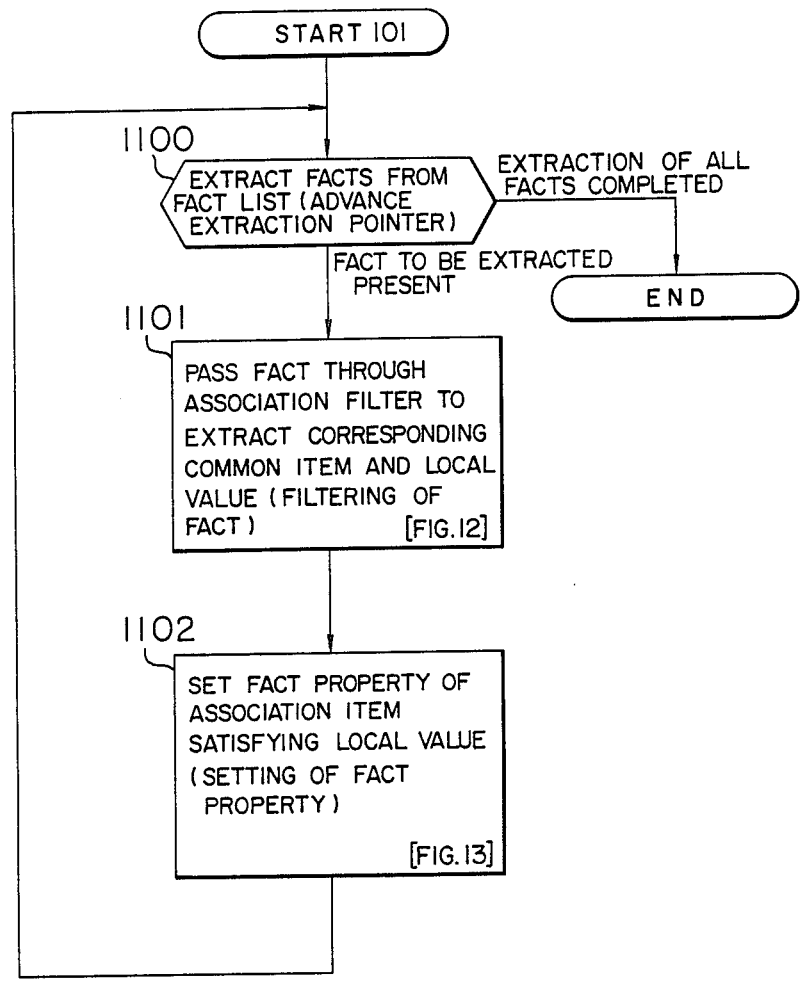
FIGS. 11-13 show flowcharts for filling facts.

FIG. 11 shows a processing flowchart of embedding an initial fact into association net 106.

Facts are sequentially extracted from initial fact file 104 (block 1100). The following processings will be carried out while any fact to be extracted exists. In block 1101, the fact is passed through association filter 105 to extract corresponding common part 230 and the local value (Filtering processing of fact of FIG. 12). Next the association item 236 with its local structure 240 matched with the local value extracted is extracted from the association list 235 of this common part 230, and vector 249 is added to the fact property 226 of the common part 230 (block 1102).

Figure 12:
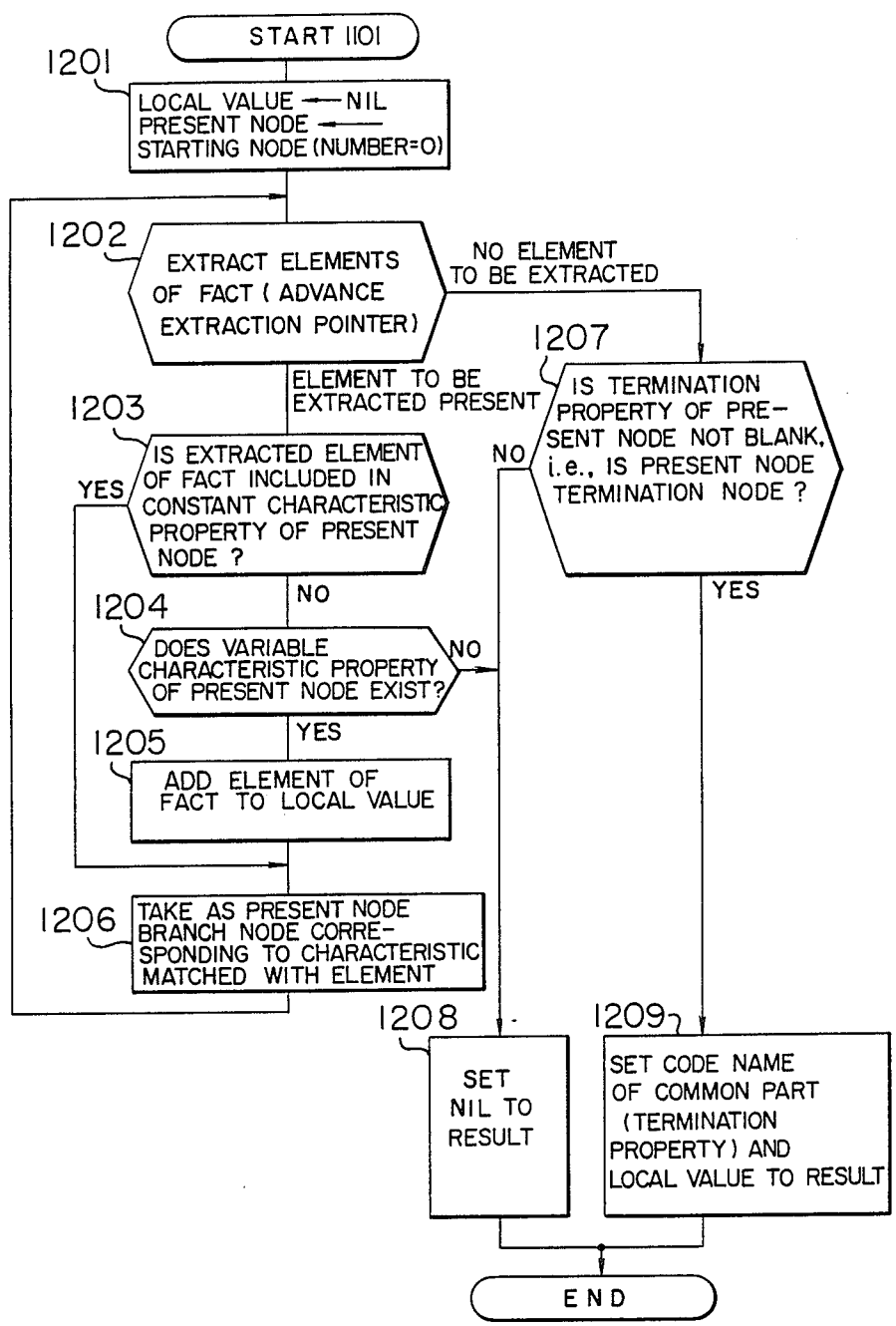

FIG. 12 shows a flowchart of the filtering processing of facts.

First, a local value (list) is set to nil and present node 500 is taken as a starting node (node number 0) (block 1201). The elements of the fact extracted in block 1100 (i.e., constants or variables constructing a sentence of the fact) are extracted sequentially from their head (block 1202). Checking is made to determine if the extracted element is included in the constant characteristic property value 505 of the present node 500. If not included, checking is made to see if the value of the variable characteristic property 502 of the present node is nil (block 1204). If nil, nil is set to the result of the fact filtering process thereby to complete the process (block 1208). If not nil, the element extracted in block 1202 is added to the local value (list) (block 1205). Thereafter or when the processing result of block 1203 is Yes, the following subsequent nodes are taken as the present node 500. Namely, in the former, the subsequent node represented by the variable characteristic property 502 is taken and in the latter, the subsequent node represented by the subsequent node portion 509 of the element of the constant characteristic property value 505 having its constant portion 508 coinciding with the extracted element is taken. Then, the processing of block 1202 is initiated again. When any element to be extracted has become nil in block 1202, checking is made to determine if the termination property 504 of the present node 500 is nil (block 1207). If non-nil, the value of the termination property 504 (i.e., common part code 235) and the local value (list) are set to the result of the filtering process of the fact (block 1209). If the termination property 504 is nil, nil is set to the result of the filtering process of the fact (block 1208).

Figure 13:
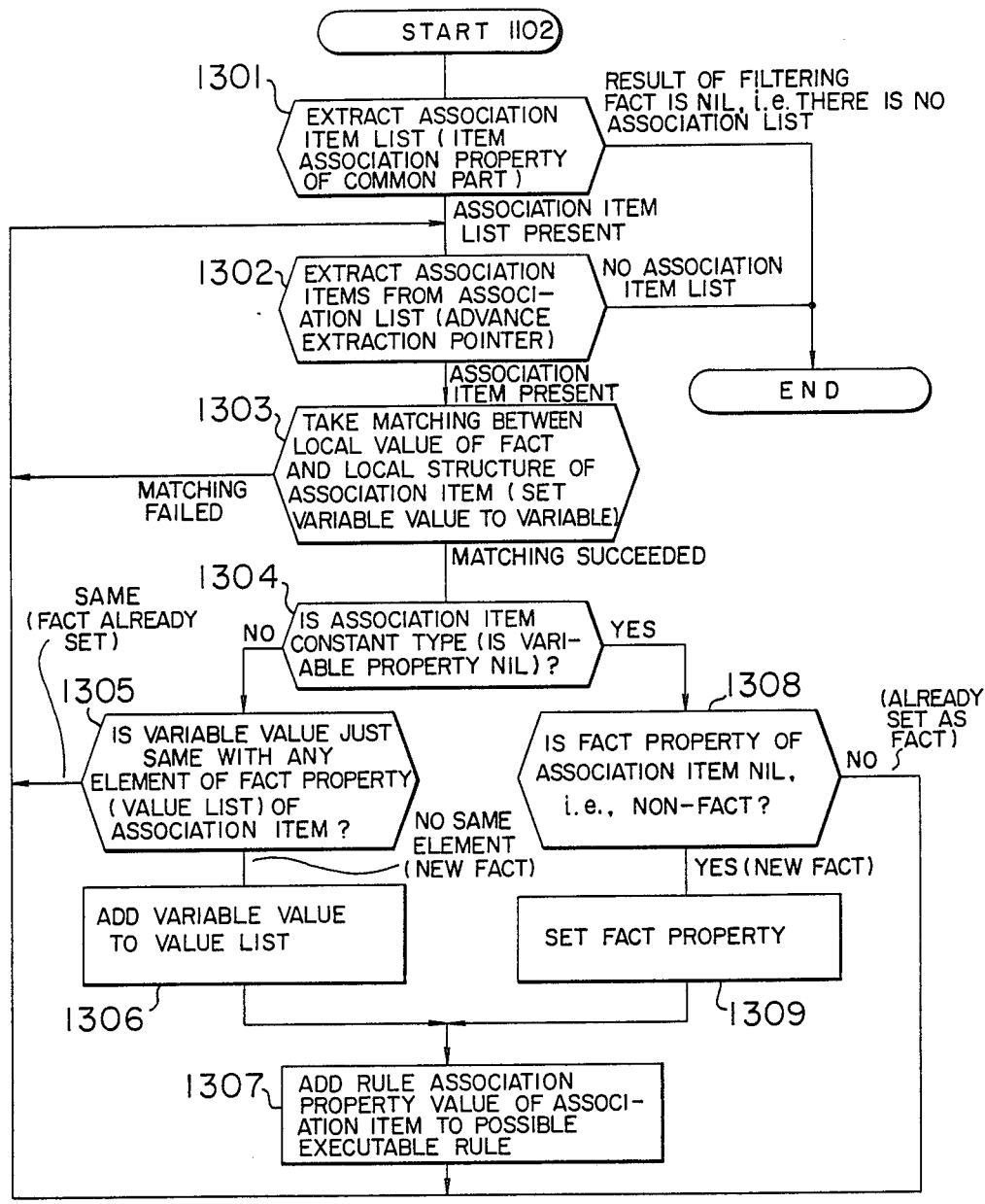

FIG. 13 shows a flowchart of the process of embedding value vectors 249 which represent a value of the fact property 226 corresponding to an initial value (fact property setting process).

First, if the result of the process of filtering facts is not nil, the value of the item association property 232 of common part 230, i.e., (common part) association item list 235, is extracted (block 1301). If the above result is nil, the fact property setting process is terminated. Next, association items 236 are sequentially extracted from their head from (common part) association list 235 to carry out the following processes (block 1302).

First, matching is taken between the local value of the fact which is a result of the filtering process of the fact, and the local structure 240 of the above association item 236. When the element 243 of the local structure 240 is a variable, the element of the local value at the corresponding position is set as a variable value for the variable (block 1303). If the matching is unsuccessful, returning to block 1302, a subsequent item is extracted. If the matching is successful, checking is made to see if the value of the variable property 227 of the above association item 236 is nil (block 1304). If nil, checking is made to see if the fact property is nil (block 1308). If not nil, returning to block 1302, the process of a subsequent association item is performed since the above fact property is the fact already embedded in association net 10. If nil, the fact property of the above association item is set to the property other than nil, for example, t (block 1309). The association rule list 250 which is a value of rule association property 222 is coupled with possibly executable rule list 260 (block 1307). Thereafter, the processing of block 1302 is initiated again.

If the variable property value of the association item is not nil in block 1304, checking is made to see if the variable value (row) set in block 1303 is just the same with any value vector 249 which is an element of the value (value list) of the fact property 226 of the association item (block 1305). If the values are the same, returning to block 1302, the processing for the subsequent association item is performed. If the values are not the same, the variable value (row) is added to value list 248 to perform the processing of block 1307.

Figure 14:
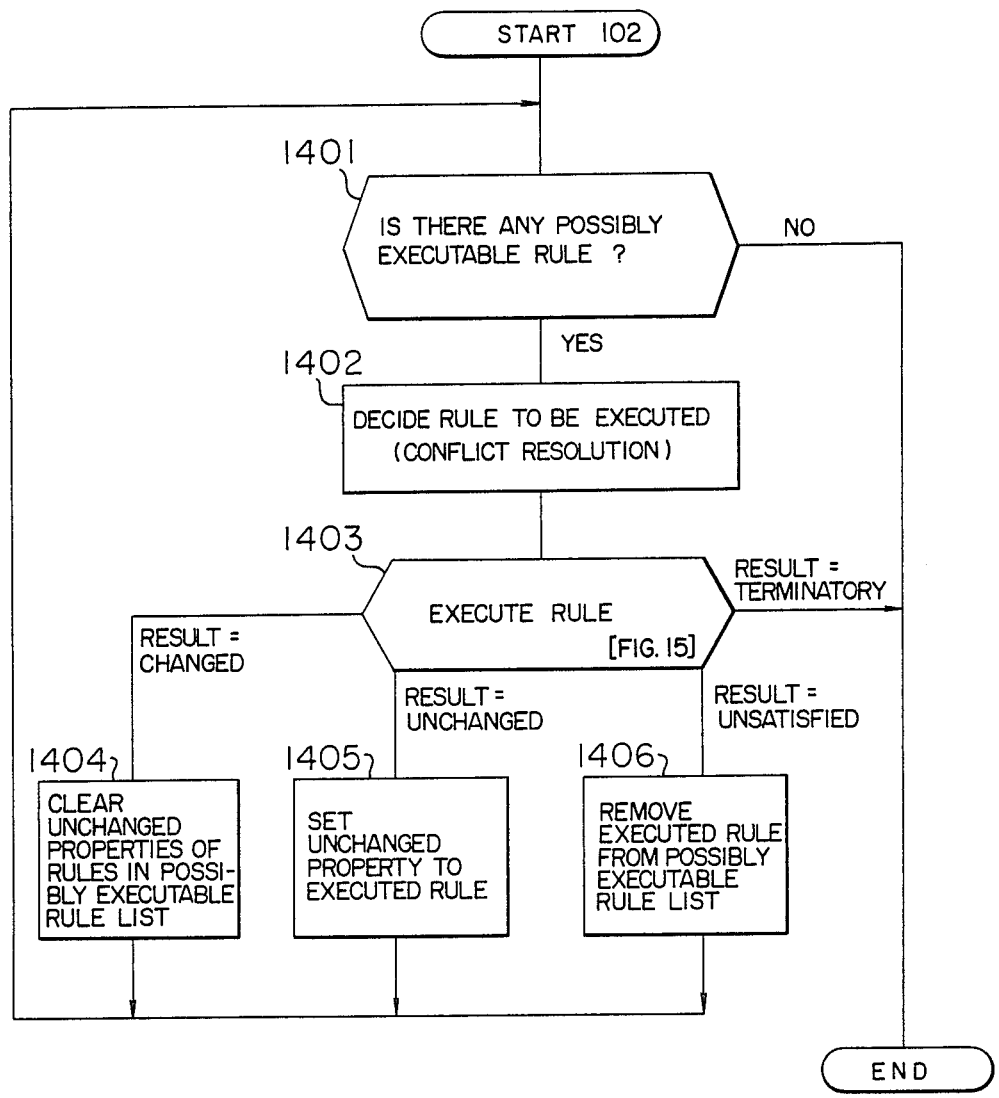

FIG. 14 shows a flowchart of the operations of processing inferrence executing processor 102.

For execution of inferrence processing, first, checking is made to determine if possible executable list 260 is nil (block 1401). If nil, the inferrence executing process is terminated. If not nil, the rule to be initially executed is selected from among possibly executable rules 261 which are elements of possible executable rule list 260 (conflict resolution block 1402). In this case, it is assumed that any rule with an unchanged property set is not selected since the result of inferrence processing thereby does not contribute to the changes in environment such as the generation of a new fact or removal of a fact. Next, the rule selected is executed (block 1403). If the result of execution is "changed" (where it contributes to the changes in environment), the unchanged property of any possibly executable rule with the unchanged property set is cleared (block 1401), and the return to block 1401 is made. If the result is "unchanged", the unchanged property is set to the executed rule (block 1405), and the return to block 1401 is made. If the result is not satisfied (when the condition of the rule is not satisfied), the executed rule 261 is removed from the possibly executable rules 260 (block 1406) and the return to block 1401 is made. If the result is "terminatory", the inferrence execution process is terminated.

Figure 15:
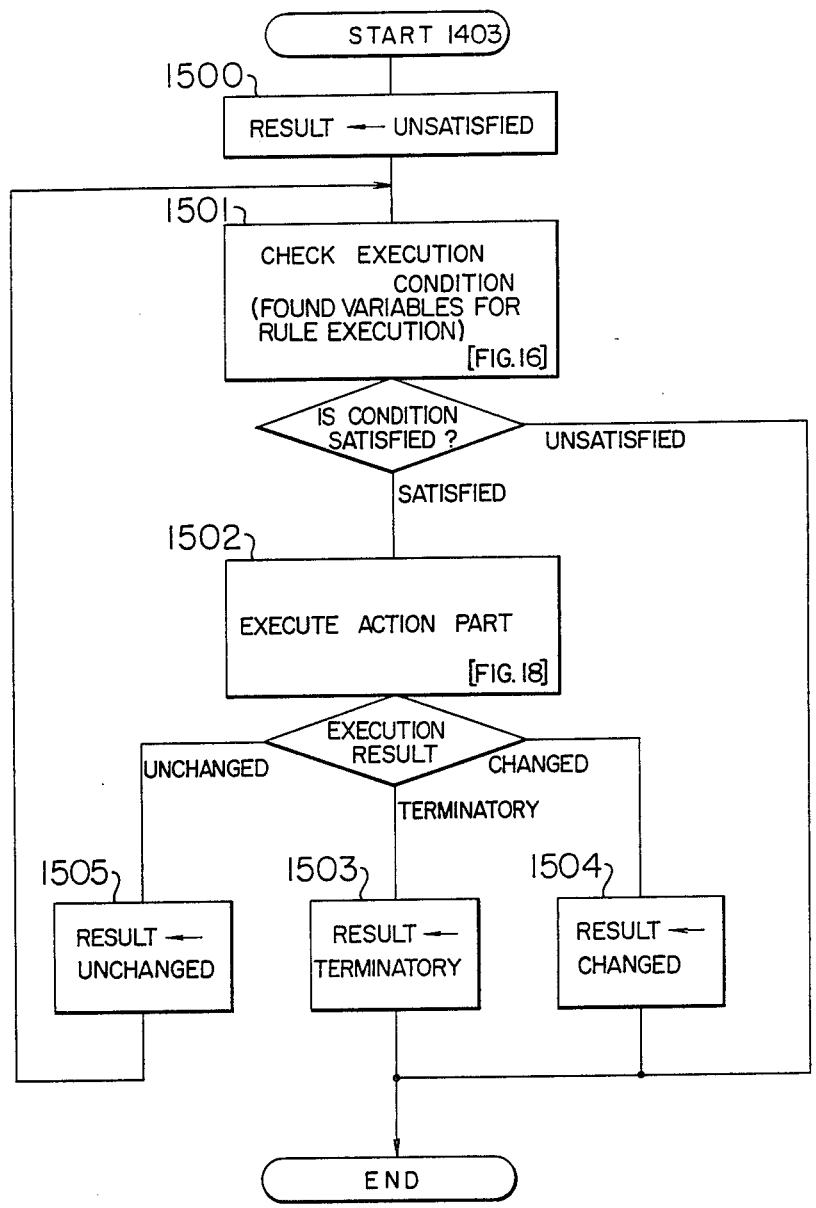

FIG. 15 shows a flowchart of the rule execution process (block 1403). First, with the result "unsatisfied" (block 1500), checking is made to see if the if-part 211 of the executed rule is satisfied. For a variable, checking is made to see if the value is determined therefor without any contradiction (block 1501). If the if-part (condition) is unsatisfied, this rule execution process is immediately terminated. If the if-part is satisfied, the action part 212 is executed (block 1502). If the result of execution is "unchanged", the result of the rule execution process is set to "unchanged" (block 1505), and further the return to block 1501 is made to check to see if the if-part satisfies a different set of values. If the result of execution of the action part is "terminatory", the result of rule execution process is set to "terminatory" (block 1503), and if "changed", the result of rule execution process is set to "changed" (block 1504). Thus, the rule execution process is terminated.

Figure 16:
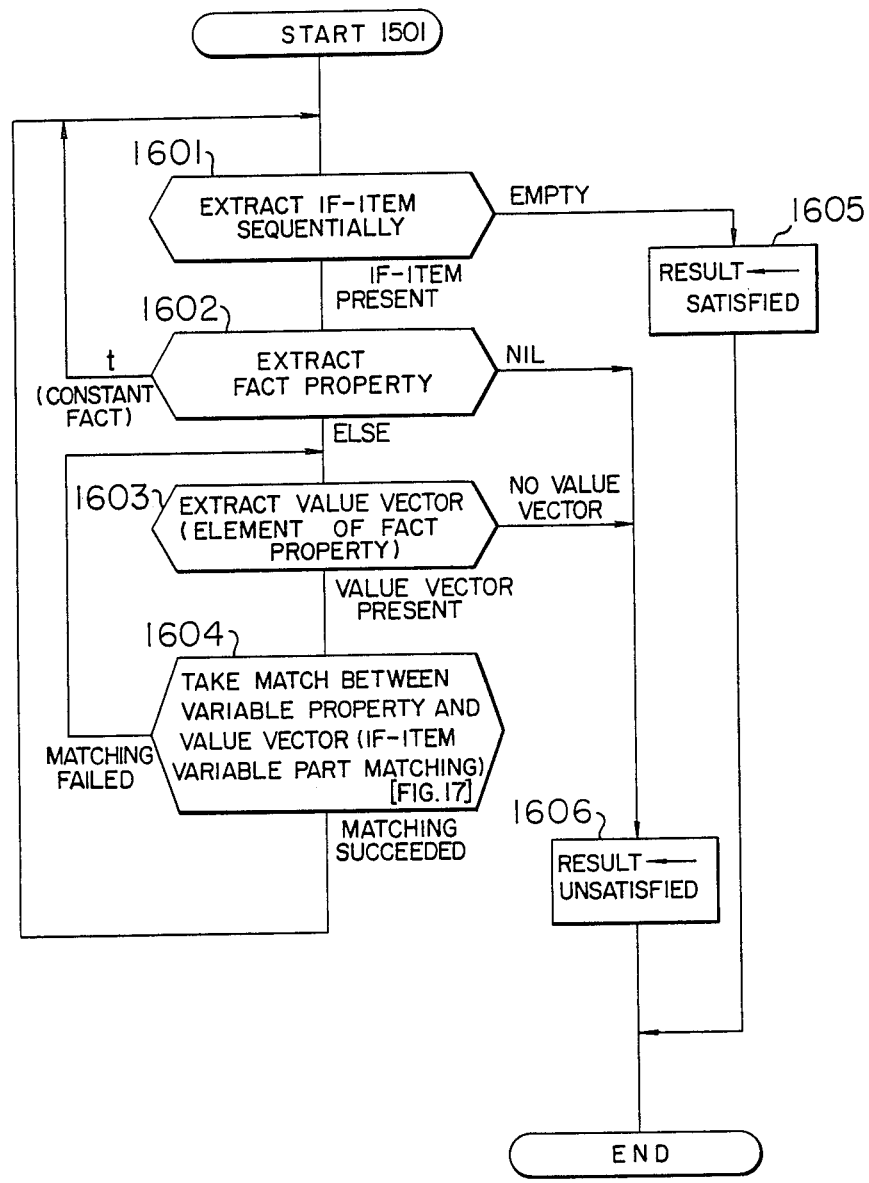

FIG. 16 shows a flowchart of the firing condition checking process (block 1501). If-items 213 are sequentially extracted from the head of the if-part 211 of the execution rule (block 1601). The fact property of the extracted if-item 213 is checked (block 1602). If the value thereof is t (which implies that the item does not include any variable and the condition is also satisfied), the return to block 1601 is made to extract a subsequent if-item. If the value of the fact property is nil, since the condition is unsatisfied, the result of the condition checking process is set to "unsatisfied" (block 1606) thereby to terminate this firing condition checking process. If the value of the fact property is other than t or nil, its elements, i.e., value rows 249 are sequentially extracted (block 1603) to take matching between the extracted value and the value (variable row 241) of variable property (if-part item-variable part matching process block 1604). If the matching is successful, i.e., the value of the variable is determined without any contradiction (which will be explained in detail referring to FIG. 17), the return to block 1601 is made to check the subsequent if-item. If the matching is unsuccessful, the return to block 1603 is made to extract the subsequent value row. After any value row to be extracted is exhausted, the processing of block 1606 is performed. After any if-item to be extracted is exhausted, the result of the condition checking process is set to "satisfied" (block 1605) to terminate the firing condition checking process.

Figure 17:
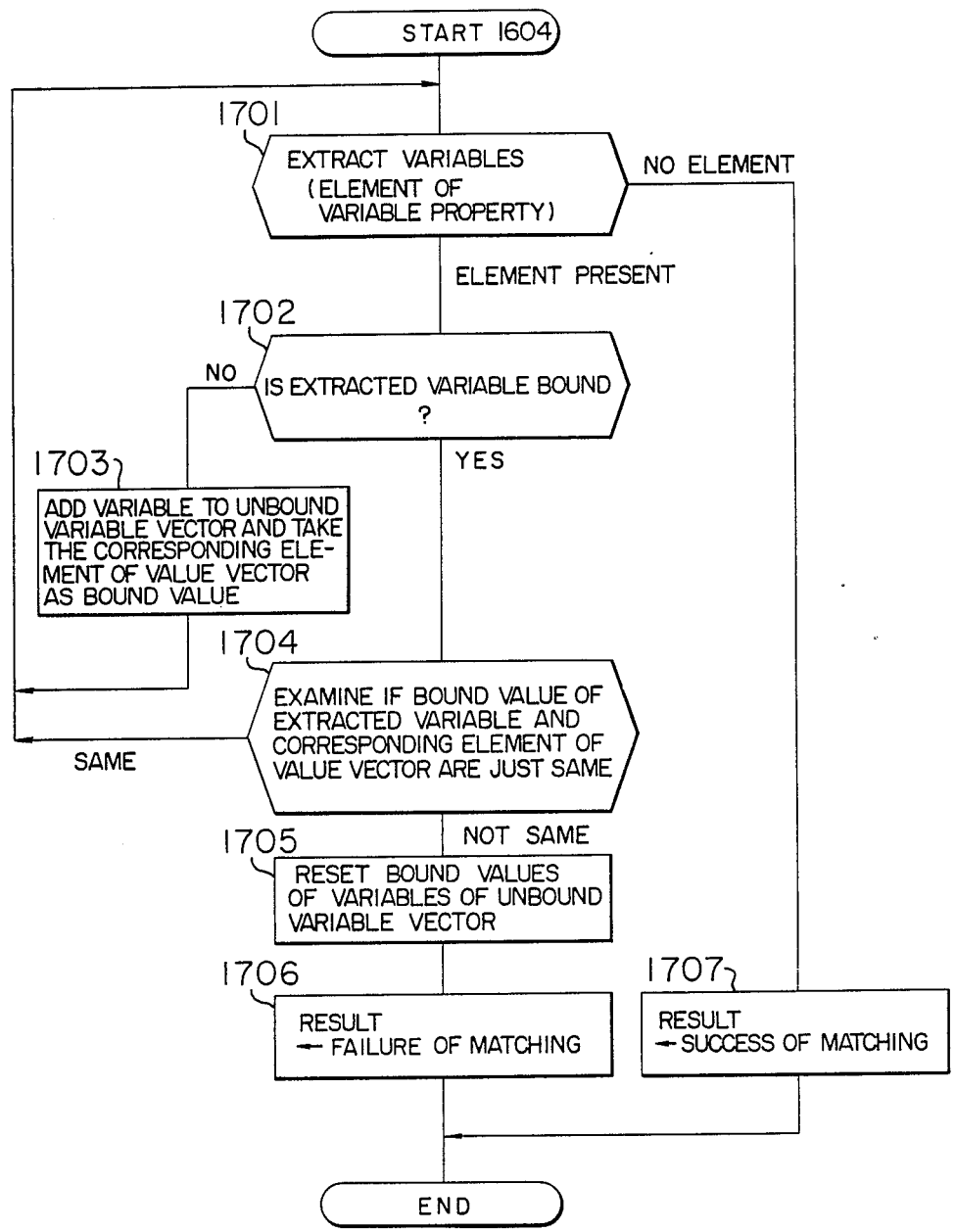

FIG. 17 shows a flowchart of the if-part item-variable part matching process.

Variables 242 which are elements of variable row 241 are sequentially extracted therefrom (block 1701). Checking is made to see if the value of the extracted variable has been determined in the matching operation with the previous if-part in the same rule, i.e., the variable is a binded variable (block 1702). If the variable is unbinded, the variable is added to an unbinded variable row to take the corresponding element of the value row 249 as a binded value (block 1703) and the return to block 1703 is made to perform the processing of the subsequent variable. If the variable is binded, checking is made to see if the binded value and the corresponding element of the value row 249 are the same. If the values are the same, the return to block 1701 is made. If the values are not the same, all variables of the unbinded variable row are caused to be unbinded to clear the unbinded variable row (block 1705) and the result of the if-item-variable part matching is set to "failure of matching" (block 1706). Thus, the pertinent process is terminated.

When any element to be extracted from the variable row 241 is exhausted, the result of the pertinent process is set to "success of matching" (block 1707), and thus the pertinent process is terminated.

Figure 18:
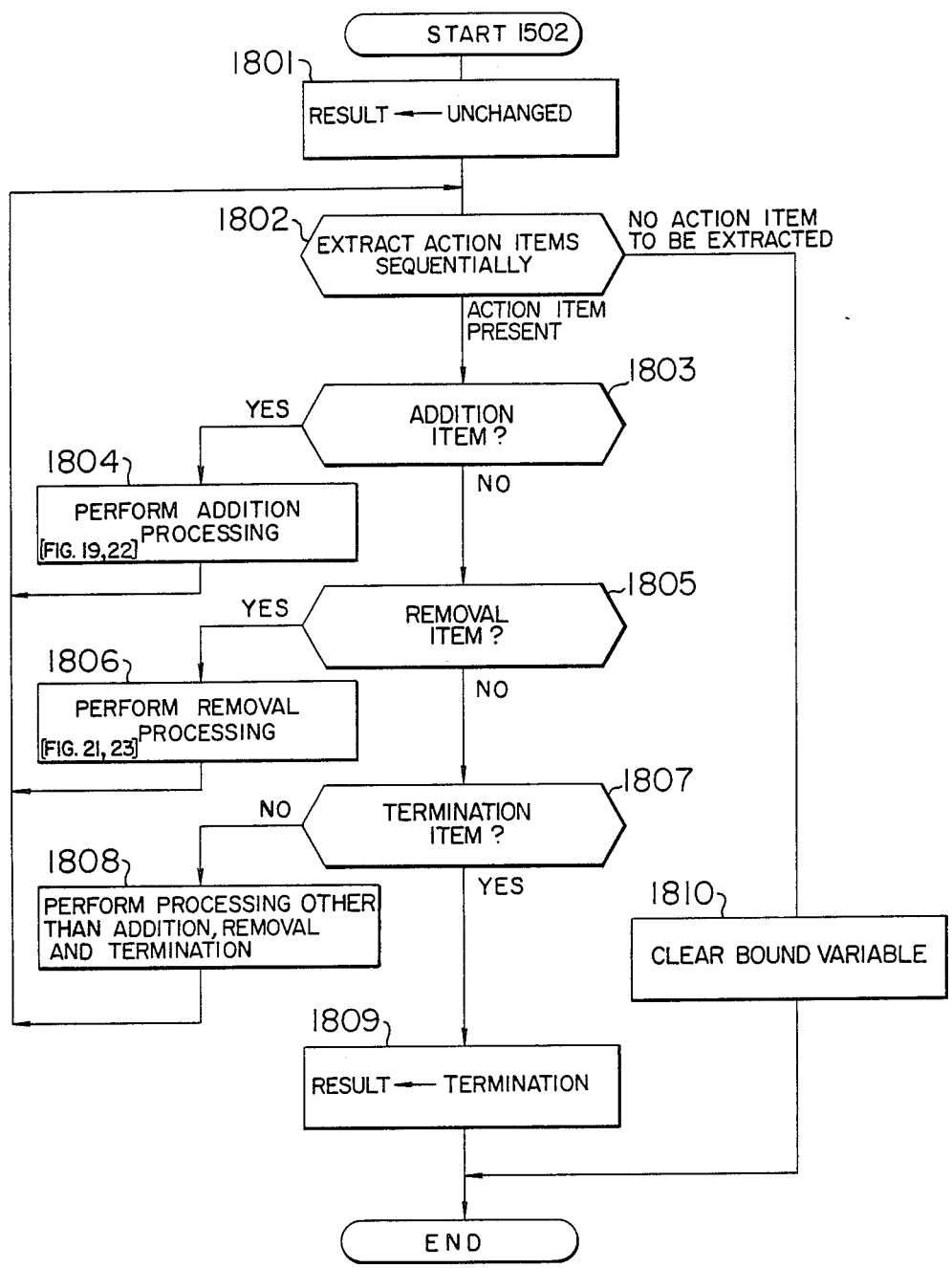

FIG. 18 shows a flowchart of the action part execution process (block 1502 of FIG. 15).

First, the result of this action part execution process is initialized to "unchanged" (block 1801). Next, action items 215–217 of the action part 212 of an execution rule are sequentially extracted from their head (block 1802). Checking is made to see if the extracted action item is item 216 to be added (block 1803). In the case of the item to be added, an addition process is performed (block 1804). Next, checking is made to see if the extracted action item is item 216 to be removed (block 1805). If so, a removal is performed (block 1806). If not, checking is made to see if it is an item 217 to be terminated (block 1807), and if so, the result of the action part execution process is set to "termination" (block 1809). Thus, the pertinent process is terminated. If the action item is not either one of the above items, the corresponding processing is performed therefor (block 1808) and the return to block 1802 is made to perform the processing of the subsequent action item. The return to block 1802 is made also after the processings in blocks 1804 and 1806. When any action item to be extracted in block 1802 is exhausted, the binded value of the variable 242 is cleared (block 1810). Thus, the action part execution process is terminated.

Figure 19:
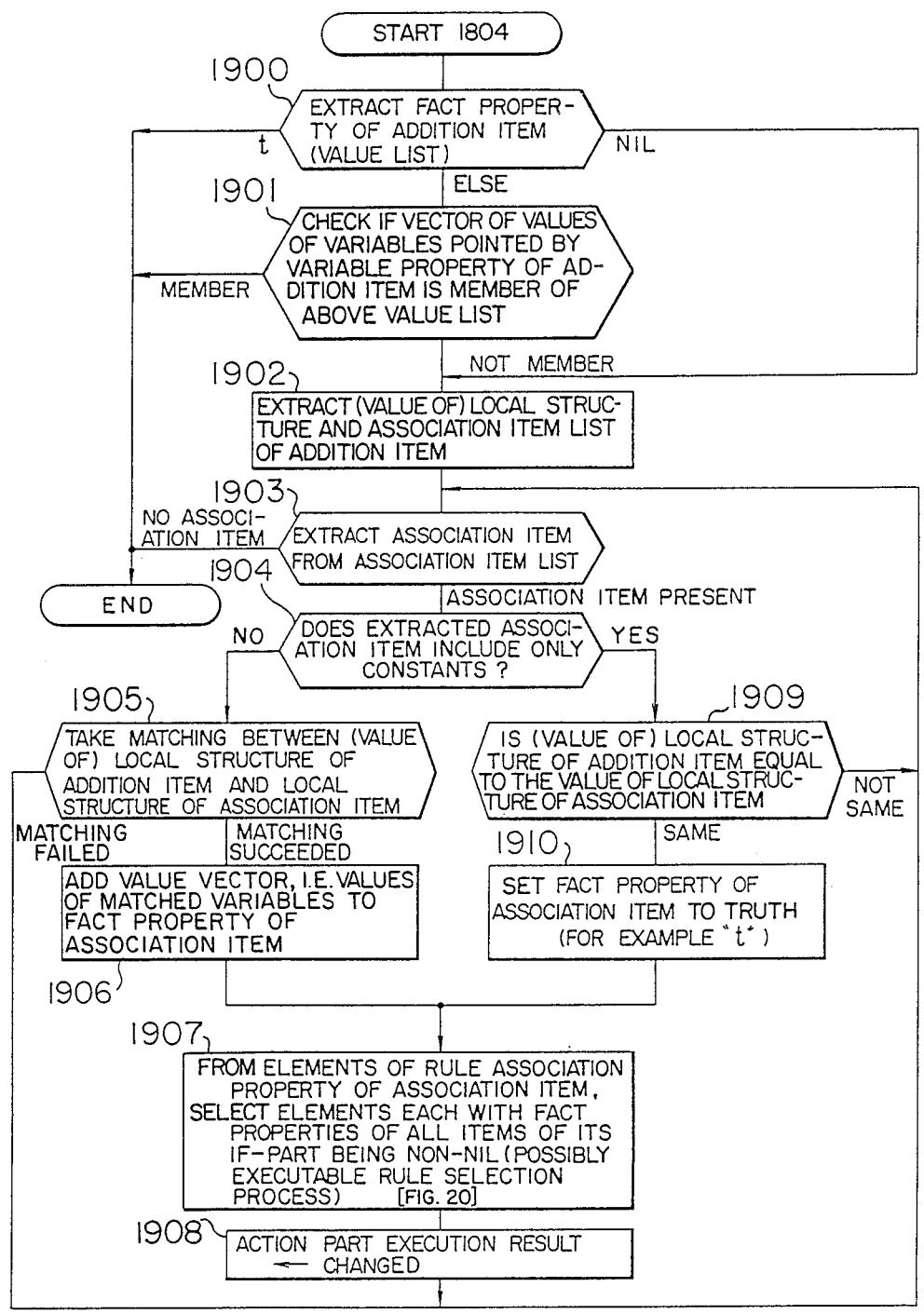

FIG. 19 shows a flowchart of the addition process (block 1804 of FIG. 18).

First, the value of the fact property 226 of the item to be added (addition item) 216 is checked. When the value is t (which implies that the addition item does not include any variable and matches only a known fact), the addition process ends immediately. if it is neither t nor nil, checking is made to see if the instance value of the variable of the addition item is a member of the value list 248 (block 1901). If it is a member, since it means the item to be added is a known fact, the addition process ends. If it is not a member, or if the result of block 1900 is nil, there are extracted the local structure 240 of the addition item, with its variable or function element being replaced by its value (referred to as local structure value) and the association item list 244 (block 1902).

Next, association items 245 which are elements of the extracted association list 244 are extracted sequentially therefrom (block 1903). When any association item to be extracted becomes nil, the addition processing is terminated. In block 1904, checking is made to see if the extracted association item is composed of only constants. If not, the processing of block 1905 is performed and if so, that of block 1909 is performed. In block 1905, matching is performed between the local structure value of the addition item 216 (extracted in block 1902) and the local structure 240 of the association item 245 extracted in block 1903. If not a match, the return to block 1903 is made. If a match, a row (value row 249) of values of the variables 242 of the association item 245 is added to the value (value row list 248) of the fact property 226 of the extracted association item 245 (block 1906). In block 1909, checking is made to see if the local structure value of the addition item 216 (extracted in block 1902) and the local structure 240 of the association item 245 are the same. (Incidentally, the matching is performed where the extracted association item includes any variable, and the matching in block 1905 is satisfied with that the constant parts are the same and so does not require the checking of the variable part. The matching in block 1909 implies the matching with the variable part excluded which is referred to that the variable parts are the same. If the variable parts are not the same, the return to block 903 is made. If the variable parts are the same, the value 248 of the fact property 226 of the association item 245 is taken as true (for example, t) (block 1910).

Following the processings of blocks 1906 and 1910, a possibly executable rule selection processing (block 1907) is performed. Among the elements of the value of the rule association property 222 of the association item, i.e., association rules 251, only the association rules having the fact properties of all the if-items 213 of its if-part 211 having values other than nil are added to the possibly executable list 260. This will be explained in detail below referring to FIG. 20. After the completion of the processing of block 1907, the result of the action part execution process is set to "changed" (block 1908) and the return to the processing of a block is made.

FIG. 20 shows a flowchart of the possibly executable rule selection processing (block 1907 of FIG. 19).

First, the rule association property value of the association item 245, i.e., association rule list 250 is extracted (block 2001). Next, association rules 251 are sequentially extracted from the head of this association rule list (block 2002). When the processings of all association rules are completed, the pertinent possibly executable selection process is terminated. Checking is made for the extracted extracted association list 251 to see if it has been already included in the possibly executable rule list 260 (block 2003). If so, the return to block 2002 is made to perform the processing of the subsequent association rule. If not, checking is made to see if there is any if-item with its fact property value being nil among the if-items of the association rule (block 2004). If there is not such an if-item, this association rule is added to the possibly executable rule list 260 (block 2005) and the return to block 2002 is made. If there is any such an if-item, the return to block 2000 is made with any processing.

Figure 21:
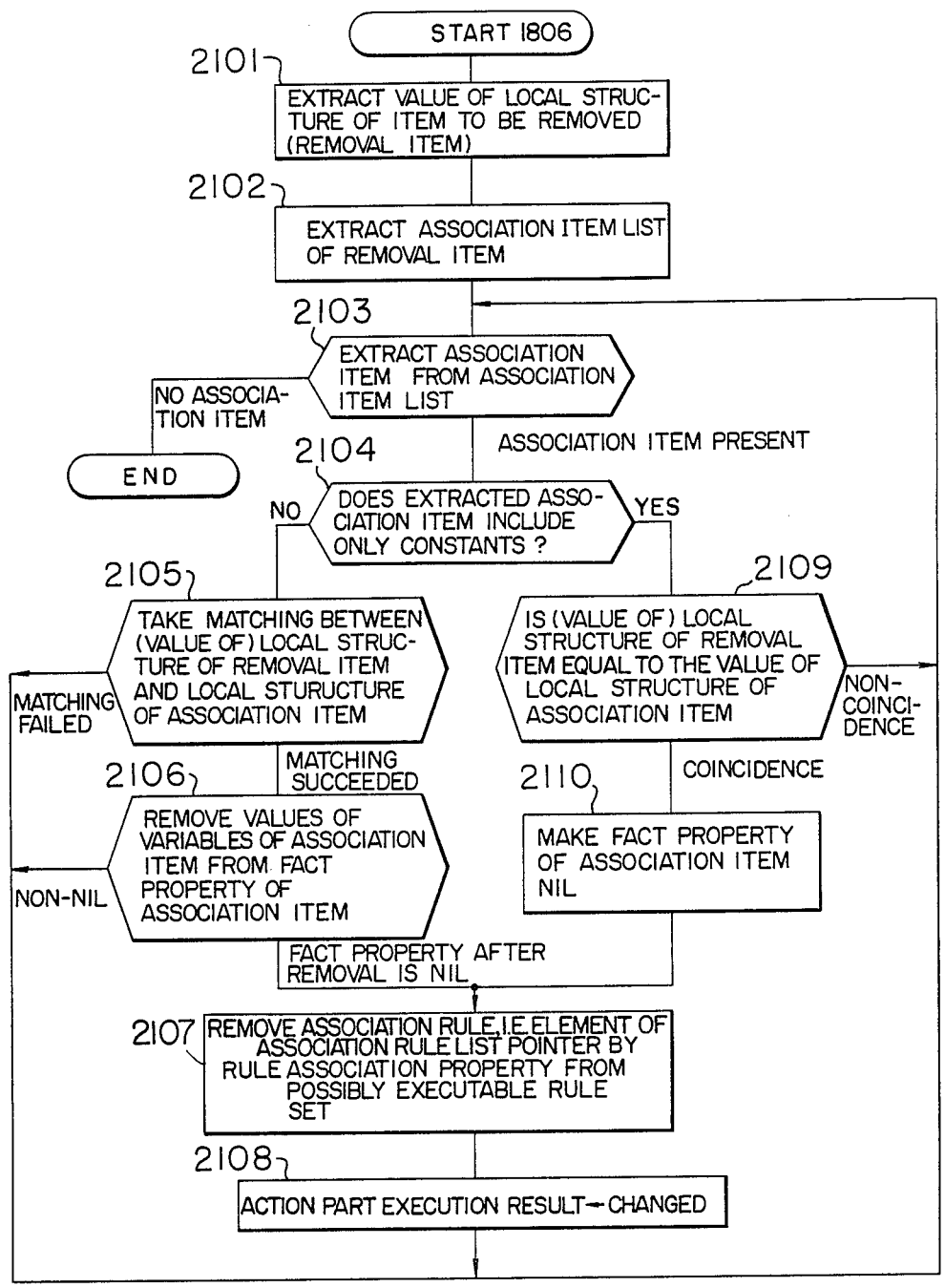

FIG. 21 shows a flowchart of the removal process (block 1806 of FIG. 18).

First, the local structure 240 of the item to be removed 215 (removal item) with its value being replaced by its value (local structure value) is extracted (block 2101). the association item list 244 of the removal item 215 is also extracted (block 2102).

Next, the association items 245 which are members of association item list 244 are sequentially extracted from the head of the list (block 1903). When any association item to be extracted is exhausted, the removal process is terminated. Checking is made for the extracted association item 245 if it includes only constants (block 2104). If "NO", the processing of block 2105 is performed, and if "YES", that of block 2109 is performed.

In block 2105, matching is taken between the loca structure value (extracted in block 2101) of the removal item and the local structure 240 of the association item 245. If the matching is not successful, the return to block 2104 is made to perform the processing of the subsequent association item. If the matching is successful, a row of values of variables 242 (value low 249) of the association item 245 is removed from the fact property value (i.e., value vector list 248) thereof (block 2106). Thus, if the fact property value of the pertinent association item becomes nil, the processing of block 2107 is performed and if it does not become nil, the processing of block 2104 is performed.

In block 2109, checking is made to see if the local structure value of the removal item 215 and the local structure 240 of the extracted association item 245 are just the same. If coincidence does not result, the return to block 2104 is made to perform the processing of the subsequent association item. If coincidence results, the fact property value 226 of the association item 245 is caused to become nil (block 2110) to perform the processing of block 2107.

In block 2107, from the possibly executable rule list 260 removed are all elements (i.e., association rules 251) of the value of the rule association property 222 of the association item 245. Following this, in block 2108, the result of the action part execution process is set to "changed", and the return to block 2103 is made.

According to the embodiment of this invention described above, inferrence efficiency and performance is improved since the number of possibly executable rules can be limited by first checking the if-part disregarding the contradiction among values of variables, or the like, thereby to efficiently restrain the overhead of the system. This overhead is abruptly increased when the if-part is not satisfied after checking to see if the if-part is satisfied for all combinations of variables.

This overhead is estimated in quantity as follows:

$$\theta = I_v{}^{Nv} \cdot Tc \cdot Nr$$

where,
Nr represents average number of rules which been added to possibly executable rules but found to unsatisfy a condition,
Nv average number of variables in the rule,
Iv average number of values ov ariables in the rule, and
Tc average time for checking if one set of variables satisfies an if-part.

In the case of $Tc=10$ mili sec., $Nv=3$, $Iv=3$, and $Nr=500$, $\theta=135$ sec. In the case of $Nr=5$ and $Iv=5$, $\theta=1500$ sec. Such an abrupt increase of overhead is not conductive to practical use. From the inventers' experiment, it has been found that in the conventional system (counting system), $Nr=550$ while in the system according to this invention $Nr=60$, and hence the overhead in this invention is reduced to about 1/10 of the conventional system. (Incidentally, the time of limiting Nr is considered to be sufficiently small since the above checking or test is carried out disregarding the contradiction among variable values.) In the experiment, it was negligible as small as 1 sec. or less.

Using an association net gives excellent efficiency of the above checking since a fact is stored as a property of an if-item.

Incidentally, the above explanation has been made with reference to inferrence processing, but it is needless to say that the system of this invention is generally applicable to information processing.

Figure 22:
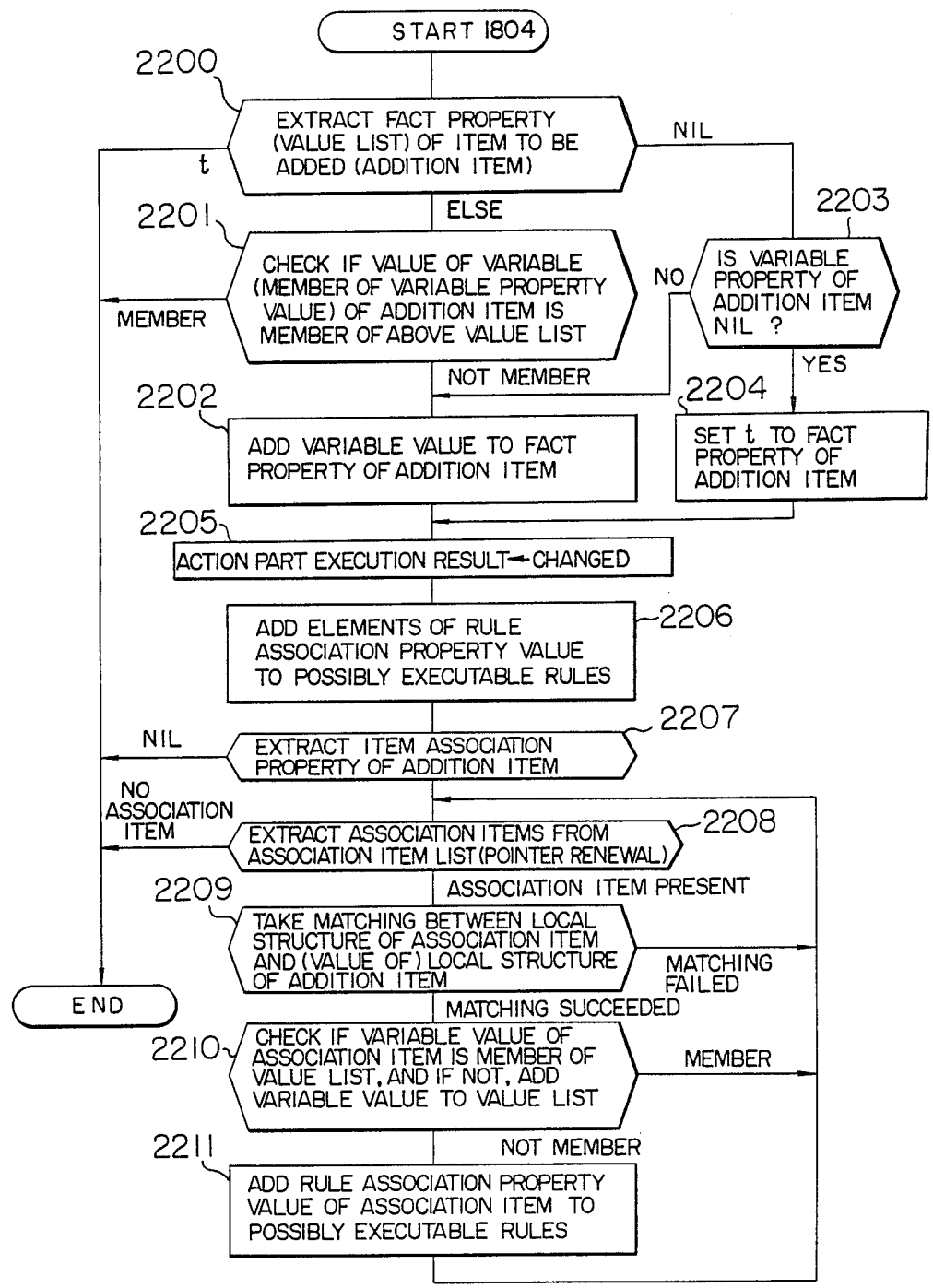

FIG. 22 shows a flowchart of the addition process in the association net system of this invention (block 1804 of FIG. 18).

First, checking is made on the value of the fact property 226 of addition item 216 (block 1900). If the value is t (which implies that the addition item does not include any variable and a known fact), the addition process is immediately terminated. If the value is nil, checking is made to see if the variable property is nil (block 1903). If YES, t is set to the fact property 226 of the addition item (block 1904). If NO, the value of the variable property 227 (variable value), i.e., variable row 241 with its each element being materialized is added to the fact property 226 of the addition item (block 1902). If the result of the processing of block 1900 is other than t or nil, checking is made to see if the variable value of the addition item is the same as any element of the value list (block 1901). If a values are the same, since it implies that the addition item is the known fact, the addition process is terminated. If the values are not the same, the above processing of block 1902 is performed. After the processings of blocks 1902 and 1904, the result of action part execution is set to "changed" (block 1905), and the value of the rule association property 222 of the addition item, i.e., association rule list 250 is coupled to possible executable rule list 260 (block 1906).

Next, the item association property 223 of the addition item is extracted (block 1907). If the item association property 223 is nil, the addition process is terminated, and if it is not nil, the elements (association items 245) of the value are sequentially extracted (block 1908). If all the processings of the association items 245 are completed, the addition process is terminated. If not so, matching is taken between the local structure 240 of the association item and that of the addition item (its variables being materialized). If the matching is unsuccessful, the return to block 1908 is made to extract the subsequent association item. If the matching is successful, checking is made to see if the variable value of the association item (explained in block 1902) is the same as any element 249 of the value list of the association item (block 1910). If any of the values are the same, the return to block 1908 is immediately made to perform the processing of the subsequent association item. If any of the values are not the same, the value of the rule association property 222 of the association item 245, i.e., association rule list 250 is coupled with the possibly executable rule list 260 (block 1911) and the return to block 1908 is made to perform the processing of the subsequent association item.

Figure 23:
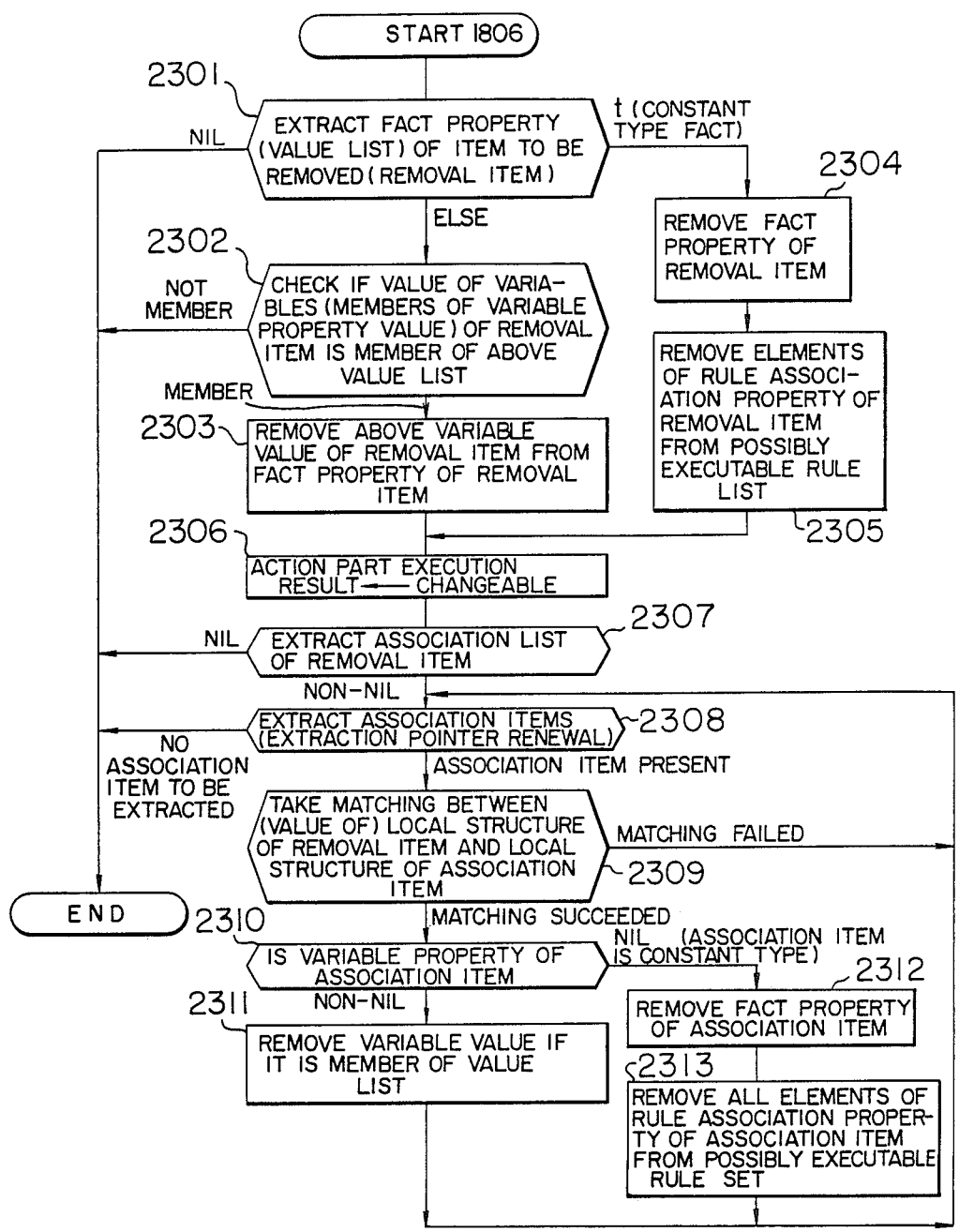

FIG. 23 shows a flowchart of the removal process (block 1806 of FIG. 18).

First, the value of the fact property 226 of the item to be removed 215 (removal item) (block 2001). If the value is nil, the removal process is terminated. If the value is t (which implies that the removal item does not include any variable and is a known fact), the fact property 226 of the removal item is caused to become nil (block 2004). And all the elements 251, of the value of the rule association property 222 of the removal item 215, i.e., association rule list are removed from the possibly executable rule list 260 (block 2005). If the result of the processing of block 2001 is other than t or nil, checking is made to see if the value (variable row 241) of the variable property 227 of the removal item 215 with its each element (variable 242) being materialized (the same variable value as defined in block) is the same as any element 249 of the value list 248 of the same removal item (block 2002). If any of the values are not the same, the removal process is terminated. If any of the values are the same, the above variable value is removed from the value of the fact property 226 of the removal item 215, i.e., value list (block 2003). After the processings of blocks 2003 and 2005, the action part execution result is set to "changed" (block 2006).

Next, the item association property 223 of the removal item 215 is checked (block 2207). If it is nil, the removal process is terminated. If it is not nil, the elements (association items 245) of the value of the item association property, i.e., association item list 244 are sequentially extracted (block 2008). When all the association items are extracted, the removal process is terminated. For the associatin item, matching is taken between its local structure 240 and the local structure of the removal structure (its variables being materialized) providing that any variable not materialized matches with any constants (block 2009). If the matching is unsuccessful, the return to block 2008 is made to perform the processing of the subsequent association item. If the matching is successful, checking is made to see if the variable property 227 is nil (block 2010). If not nil, checking is made to see if the variable value (defined in block 2002) of the association item is the same as any element 249 of the value list 248 of the same association item. If any of the values is the same, the variable value is removed. If any of the values is not the same, the return to block 2008 is made. If the result of the processing of block 2010 is nil, since the association item includes only definitions, the fact property 226 of the association item is caused to be nil (block 2012). And all the elements 251 of the value of the rule association property 222 of the association item, i.e., association rule list are removed from the association rule list 250 and the return to block 2008 is made.

Meritorious effects of this invention are as follows.

(1) Since rule groups which may probably be fired subsequently to the execution of a certain rule have been previously preserved or embedded in the association net, time for searching the rule to be executed subsequently does not depend on the number of entire rules.

(2) Since if an if-part is a fact is reserved, it is not necessary to take between the if-part and all the facts in fact space, unlike the conventional system. Namely the time required to check to see if the if-part is a fact does not depend on the number of facts. From this and (1), the inference time is independent of the number of rules x facts. In a practical inference system in which the number of rules is several hundreds, and that of facts is over 50, its efficiency is improved to several hundred times or more even considering the indispensable overhead.

(3) Since there are not employed any computer system or element having a specific architecture such as a multiprocessor, associative memory, etc., a high speed system can be implemented at low cost, and the system according to this invention is easily applicable for software.

(4) For the fact which is added or removed by the execution of the rule, its interrelations of common elements such as its constant elements are already inserted in the association net, so that only the values of its variable elements (values taken by the variables during execution) is required to take matching with a known fact. Thus, the matching time which occupies most of the overhead is shortened. The variable elements of a sentence representing a fact are commonly 10-20 percent of the entire elements of the sentence so that the matching time is shortened to 1/5-10.

(5) Man-machine interface and operability are not impaired in exchange for improvement of performance since there are inputted facts and rules in which the constant or variable elements are placed at any position in a sentence (i.e., rules represented in the manner of natural language) and also are outputted as the result of inferrence processing in the same manner.

(6) Coupling if-items having their partial variable elements specified as particular constant with ones having variable elements not specified results in these if-items being efficiently subjected to processings as an association group. Therefore, the efficiency of system in-description, representation, etc. of knowledge can be improved without impairing the operability of the system.

(7) Since the embedding of initial facts into the association net is made by using an association filter, the insertion time is not proportional to the total number of items of all rules x the number of facts but is decreased to is logarithm.

(8) At the time of fact removal, only rules having association items composed of constants in its if-part are removed from a possibly executable rule assemblage, so that the number of checking if-parts of the unnecessary rules is decreased in short overhead. Thus the processing speed of the entire system is enhanced.

(9) An unchanged property is set to the rules which have not changed an environment because of the addition, removal, etc. of a new fact, as a result of their execution. Thus, execution of such rules are inhibited, thereby decreasing wasteful time of if-part checking, and execution time and hence enhancing the processing time of the entire system.

(10) Where there occurs a change of environment because of the addition, removal, etc. of a new fact, as a result of execution of a certain rule, the same rule is not executed for the other variable value, but if there is found any rule to be preferentially executed because of the change of environment, as a result of checking a possibly executable rule assemblage or list, the rule is executed. Thus, a natural conflict resolution can be made.

(11) The rule to be added to or removed from the possibly executable assemblage can be determined only by the matching among variable parts included in items, so that the entire processing efficiency is increased by the time for unnecessary matching among constant parts.

(12) Since a fact is stored in only its portion corresponding to the variable, as a value of the variable, the required capacity of the memory may be small even if the fact is stored for each item.

(13) A termination node (final state) is not specifically formed in the association filter, and a node can have both properties of termination and non-termination. Thus, simple processing and good storage efficiency can be obtained.

(14) The above unchanged property (see (9)) is cleared if the environment is changed by the execution of the other rule. Thus, there is given a chance of executing the rule having the unchanged property in a new environment without performing a complicated processing if the result of processing of the rule having the unchanged property changes the new environment.

(15) Since the rule which has been found to not satisfy its if-part at the time of its execution is removed from the possibly executable assemblage, there does not occur a reduction of processing efficiency which is attributable to a wasteful if-part matching check.

(16) If any if-item of a rule is satisfied by addition of a fact, the rule is taken as a possibly executable rule (or is added to a possibly executable rule assemblage) and the other if-items are checked at the time of its execution. Therefore, this system permits possibly executable rules to be limited through simple checking, and provides an improved processing efficiency. In the system, any rule which does not satisfy all execution conditions are not added to possibly executable rules, and the processing when a fact is removed is complicated.

(17) The association filter is required to identify only common items so that in the same state (node) it does require a complicated variable processing as in the case where many kinds of variable are inputted. Thus, it provides simple processing and good efficiency of processing. Particularly, the association filter is frequently used for embedding of facts, for example and influences the performance of the entire system so that the improvement of the processing efficiency of the association filter contributes to that of the performance of the entire system.

Incidentally, the above explanation has been made on inferrence, but the system described above is applicable to general information processing.

We claim:

1. An information processing method for a high speed processing system for use in performing information processing by repeating a cycle during which, when rules each having an if-part and an action part, and a plurality of propositional data each indicating a fact or a hypothesis, are provided, the action part of a rule with the if-part satisfied by the propositional data is executed to alter the propositional data, the method comprising the steps of registering propositional data as a propositional property of an if-item, checking all if-items of the if-part of the rule to determine whether or not their propositional properties are nil, and adding only the rule which has an if-item which is not nil in its propositional property to a list of possibly executable rules, wherein from said list of possibly executable rules the rules which have been found to have their if-part not satisfied as a result of complete if-part checking are removed.

2. An information processing method for a high speed processing system for use in performing information processing by repeating a cycle during which, when rules each having an if-part and an action part, and a plurality of propositional data each indicating a fact or a hypothesis, are provided, the action part of a rule with the if-part satisfied by the propositional data is executed to alter the propositional data, the method comprising the steps of registering propositional data as a propositional property of an if-item, checking all if-items of the if-part of the rule to determine whether or not their propositional properties are nil, and adding only the rule which has an if-item which is not nil in its propositional property to a list of possibly executable rules, further comprising the steps of removing propositional data from the propositional property of the corresponding if-item of a rule when the propositional data is removed as a result of execution of that rule, checking to determine if the propositional property of said if-item is nil, and removing all rules having an if-item from said list of possibly executable rules, if said propositional property is nil.

3. An information processing method for use in a computer system having first memory means for storing a plurality of rules, each rule including a condition part (if-part) composed of at least one condition item and an action part (then-part) composed of at least one action item; second memory means for storing a plurality of propositional data each of which is expressed by terms indicating a fact or a hypothesis, some of said propositional data including concrete values of variables; and data processing means for selecting from said plurality of rules the one rule having a condition part which is satisfied by said propositional data to thereby execute the action item to add a new propositional data to said second memory means or delete the existing propositional data; said information processing method comprising:

a first step of reading sequentially the rules from said first memory means for creating an association network for relating a plurality of the rules to one another in accordance with the contents of the items constituting each of said rules, said association network including a plurality of propositional property storing areas each of which is provided for a respective one of said items for storing concrete values corresponding to the variable contained in said item;

a second step of reading sequentially the propositional data from said second memory means to store the parts of said propositional data which become the concrete values of the variables in the propositional property storage areas on said association network for all the items corresponding to said propositional data; and a third step of grouping a number of the rules having the items imparted with the values of the variables at said second step into a set of candidate rules for execution and selecting from said set the one rule for which the concrete values of the variables required by the condition part are available, to thereby execute an action part of said one rule.

4. An information processing method according to claim 3, wherein said third step includes a step of excluding from said set of candidate rules for execution a rule which includes at least one condition item for which the corresponding propositional property storage area is empty.

5. An information processing method according to claim 4, wherein said third step includes a step of selecting one rule from said set of candidate rules for execution and checking the relation of the concrete values of the variables among the individual condition items when said selected rule has a plurality of the condition items.

6. An information processing method according to claim 3, further comprising:

when one of said propositional data stored in said second memory means is deleted as a result of execution of said rule, the step of deleting the values of the concrete variables contained in said deleted propositional data from the propositional property storage areas for all the items corresponding to said deleted propositional data; and a step of checking whether the propositional property storage areas from which said concrete values are deleted are empty and excluding from said set of candidate rules all the rules which have the respective condition parts including the respective items corresponding to those propositional property storage areas found to be empty through said check.

7. An information processing method according to claim 3, further comprising:

when a new propositional data is created as a result of execution of said rule, a step of adding the part contained in said created fact and constituting the concrete value for the variable to the propositional property storage areas on said association network for all the items corresponding to said propositional data; and a step of checking the propositional property storage areas corresponding to the condition items of the rule having the items newly added with said concrete value of the variable, to thereby add said rule to the set of candidate rules for execution when all the condition items have been found not to be empty as a result of said check.

8. An information processing method according to claim 3, wherein said first step includes a step of extracting from the item of the rule read out from said first memory means a pattern of terms common to other items, wherein a plurality of said items having said pattern of terms are associated with one another on said association network.

9. An information processing system, comprising:

first memory means for storing a plurality of rules, each rule including a condition part (if-part) composed of at least one condition item and an action part (then-part) composed of at least one action item;

second memory means for storing a plurality of propositional data each of which is expressed by terms indicating a fact of hypothesis, some of said propositional data including concrete values of variables; and data processing means for selecting from said plurality of rules the one rule having a condition part which is satisfied by said propositional data to thereby execute the action item to add a new propositional data to said second memory means or delete the existing propositional data, said data processing means including means for:

(1) reading sequentially the rules from said first memory means for creating an association network for relating a plurality of the rules to one another in accordance with the contents of the items constituting each of said rules, said association network including a plurality of propositional property storing areas each of which is provided for a respective one of said items for storing concrete values corresponding to the variable contained in said item;

(2) reading sequentially the propositional data from said second memory means to store the parts of said propositional data which become the concrete values of the variables in the propositional property storage areas of said association network for all the items corresponding to said propositional data; and (3) grouping a number of the rules having the items imparted with the values of the variables at said second step into a set of candidate rules for execution and selecting from said set the one rule for which the concrete values of the variables required by the condition part are available, to thereby execute the action part of said one rule.

10. An information processing system according to claim 9, wherein said grouping of a number of the rules includes excluding from said set of candidate rules for execution a rule which includes at least one condition item for which the corresponding propositional property storage area is empty.

11. An information processing system according to claim 10, wherein said grouping of a number of the rules includes selecting one rule from said set of candidate rules for execution and checking the relation of the concrete values of the variables among the individual condition items when said selected rule has a plurality of the condition items.

12. An information processing system according to claim 9, wherein said data processing means also includes means for:
   (4) when one of said propositional data stored in said second memory means is deleted as a result of execution of said rule, deleting the values of the concrete variables contained in said deleted propositional data from the propositional property storage areas for all the items corresponding to said deleted propositional data; and
   (5) checking whether the propositional property storage areas from which said concrete values are deleted are empty and excluding from said set of candidate rules all of the rules which have respective condition parts which include the respective items corresponding to those propositional property storage areas found to be empty through said check.

13. An information processing system according to claim 9, wherein said data processing means also includes means for:
   (4) when a new propositional data is created as a result of execution of said rule, adding the part contained in said created propositional data and constituting the concrete value for the variable to the propositional property storage areas on said association network for all of the items corresponding to said propositional data; and
   (5) checking the propositional property storage areas corresponding to the condition items of the rule having the items newly added with said concrete value of the variable, to thereby add said rule to the set of candidate rules for execution when all of the condition items have been found not to be empty as a result of said check.

14. An information processing system according to claim 9, wherein said sequential reading of the rules from said first memory means includes extracting from the item of the rule read out from said first memory means a pattern of terms common to other items, wherein a plurality of said items having said pattern of terms are associated with one another on said association network.

* * * * *